(12) United States Patent
Kasuga et al.

(10) Patent No.: US 10,599,089 B2
(45) Date of Patent: Mar. 24, 2020

(54) IMAGE FORMING SYSTEM

(71) Applicant: Konica Minolta, Inc., Chiyoda-ku, Tokyo (JP)

(72) Inventors: Akio Kasuga, Hachioji (JP); Kenji Kawatsu, Kodaira (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 282 days.

(21) Appl. No.: 15/687,629

(22) Filed: Aug. 28, 2017

(65) Prior Publication Data

US 2018/0081317 A1    Mar. 22, 2018

(30) Foreign Application Priority Data

Sep. 16, 2016 (JP) ................. 2016-181151

(51) Int. Cl.
*G03G 15/00* (2006.01)
*H04N 1/00* (2006.01)

(52) U.S. Cl.
CPC ..... *G03G 15/6582* (2013.01); *G03G 15/6573* (2013.01); *H04N 1/00408* (2013.01); *H04N 1/00591* (2013.01); *H04N 1/00745* (2013.01); *H04N 1/00992* (2013.01); *H04N 2201/0094* (2013.01)

(58) Field of Classification Search
CPC ................................................. G03G 15/6582
USPC ....................................................... 399/407
See application file for complete search history.

(56) References Cited

U.S. PATENT DOCUMENTS

| 6,052,553 | A | * | 4/2000 | Acquaviva | ......... G03G 15/6573 |
| | | | | | 399/341 |
| 2003/0202830 | A1 | * | 10/2003 | Oh | ......................... B65H 37/00 |
| | | | | | 399/390 |
| 2005/0158099 | A1 | * | 7/2005 | Segerer | .............. G03G 15/6538 |
| | | | | | 399/407 |
| 2008/0290591 | A1 | * | 11/2008 | Shimizu | .................. B41F 23/00 |
| | | | | | 271/208 |
| 2009/0317160 | A1 | * | 12/2009 | Kougami | ........... G03G 15/6576 |
| | | | | | 399/406 |
| 2012/0189330 | A1 | * | 7/2012 | Kunimatsu | ........ G03G 15/1665 |
| | | | | | 399/44 |

FOREIGN PATENT DOCUMENTS

| JP | 3478815 B2 | 12/2003 |
| JP | 3528047 B2 | 5/2004 |
| JP | 3584145 B2 | 11/2004 |
| JP | 5279441 B2 | 9/2013 |
| JP | 5482820 B2 | 5/2014 |

* cited by examiner

*Primary Examiner* — Anthony H Nguyen

(74) *Attorney, Agent, or Firm* — Buchanan Ingersoll & Rooney PC

(57) ABSTRACT

An image forming system includes an image forming apparatus that forms an image on a sheet, and a finisher that performs a post-printing process with the sheet. The image forming system comprises: a paper path through which the sheet is passed; an electricity eliminator that is arranged in the upstream side of the finisher to apply at least one agent of water and charge to the sheet; and a hardware processor that controls an application amount of the agent to be applied to the sheet by the electricity eliminator based on an amount of charge which is generated on the sheet when the sheet is passing through the paper path.

21 Claims, 22 Drawing Sheets sheet passing direction tendency to be minus ↓  ↑ tendency to be plus (+)
asbestos
human hair/fur
glass
mica
nylon
silk
rayon
cotton
hemp
wood
(human body)
paper
ebonite
gold/cupper/iron/aluminium
rubber
polyester
acryl (fiber)
vinyl chloride
teflon
(−)

IMAGE FORMING SYSTEM

Japanese Patent Application No. 2016-181151 filed on Sep. 16, 2016 including description, claims, drawings, and abstract the entire disclosure is incorporated herein by reference herein in its entirely.

BACKGROUND

Technical Field

The present invention relates generally to an image forming system.

Description of the Related Art

Conventionally, after forming an image on a sheet by an image forming apparatus, the sheet may be processed by a finisher to perform post-printing processes. However, since sheets conveyed to a finisher may sometimes be stuck to each other due to static electricity, the quality of post-printing processes may be degraded.

When conveying a sheet, the static electricity of the sheet is generated by peeling charge when the sheet is peeled off from a roller nip, friction charge due to microslippage of the sheet at the roller nip, charge transfer from the sheet to a guide member, or the like. Such peeling charge, friction charge, charge transfer or the like is easily influenced by a temperature and a humidity environment on sheet conveying routes, the paper quality of a sheet, the toner amount attached to a sheet, the charged quantity of a guide member or the like. Also, the greater the potential difference between the front and back sides of a charged sheet increases, the greater the attractive force exerted between sheets increases. Accordingly, if a post-printing process is performed with sheets stuck together by the attractive force exerted therebetween, the quality of the post-printing process may be degraded. For example, when performing a sheet aligning process for aligning leading or tailing edges of sheets, or when a side edges aligning process for aligning sheets during stacking discharged sheets, if there is generated an inter-paper attractive force which hinders sheets from being aligned due to static electricity, a paper jam or paper damage may occur. It is thereby desirable to eliminate the static electricity of a sheet for preventing the quality of a post-printing process from being degraded.

Because of this, in various conventional techniques, it has been proposed to form a discharging circuit for eliminating static electricity when a sheet comes in contact with a discharging member to conduct static electricity to ground so that the static electricity is eliminated from the sheet (for example, refer to Japanese Granted Patent Publication No. 3478815, Japanese Granted Patent Publication No. 3584145, and Japanese Granted Patent Publication No. 3528047).

Meanwhile, in various conventional techniques, it has been proposed to feed back the reading result of an image formed on a sheet and correct color tones of the image and the like (for example, refer to Japanese Granted Patent Publication No. 5482820 and Japanese Granted Patent Publication No. 5279441).

For example, an image reading apparatus may be provided between an image forming apparatus and a finisher for the purpose of feeding back the reading result of an image formed on a sheet and correcting color tones of the image and the like. In such an arrangement, a paper path through the image reading apparatus is narrower than that in the arrangement in which no image reading apparatus is provided. A sheet is thereby likely to come in contact with the paper path in the image reading apparatus. Accordingly, further static electricity can be generated due to the friction between a sheet and the paper path in the image reading apparatus. In the case where an image reading apparatus is provided between an image forming apparatus and a finisher, thereby, it is impossible to sufficiently eliminate static electricity by the prior art techniques such as described in Japanese Granted Patent Publication No. 3478815, Japanese Granted Patent Publication No. 3584145, Japanese Granted Patent Publication No. 3528047, Japanese Granted Patent Publication No. 5482820 and Japanese Granted Patent Publication No. 5279441.

SUMMARY

Namely, in the case where an image reading apparatus is arranged in the upstream side of a finisher, the prior art techniques such as described in the above Patent Publications cannot be used to prevent degradation of the quality of a post-printing process due to static electricity.

Taking into consideration the above circumstances, it is an object of the present invention therefore to provide an image forming system which can prevent degradation of the quality of a post-printing process due to static electricity of a sheet even if an image reading apparatus is arranged in the upstream side of a finisher.

To achieve at least one of the abovementioned objects, according to one aspect of the present invention, an image forming system includes an image forming apparatus that forms an image on a sheet, and a finisher that performs a post-printing process with the sheet, and comprises: a paper path through which the sheet is passed; an electricity eliminator that is arranged in the upstream side of the finisher to apply at least one agent of water and charge to the sheet; and a hardware processor that controls an application amount of the agent to be applied to the sheet by the electricity eliminator based on an amount of charge which is generated on the sheet when the sheet is passing through the paper path.

BRIEF DESCRIPTION OF THE DRAWING

The advantages and features provided by one or more embodiments of the invention will becomes more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In what follows, embodiments of the present invention will be explained with reference to drawings. However, the present invention is not limited to the following specific embodiments.

Embodiment 1

Figure 1:
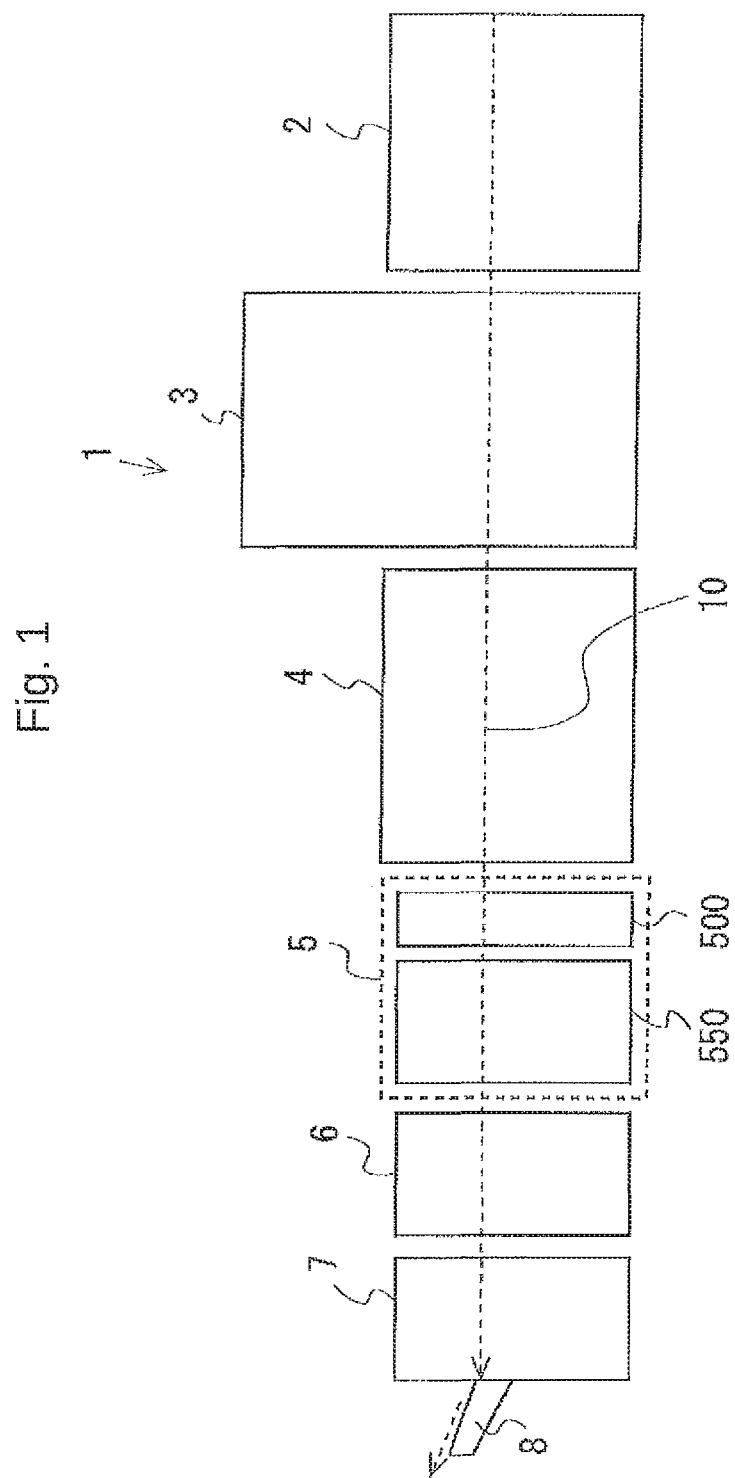
FIG. 1 is a schematic view for showing an example of the overall configuration of an image forming system 1 in accordance with an embodiment 1 of the present invention.

FIG. 1 is a schematic view for showing an example of the overall configuration of an image forming system 1 in accordance with an embodiment 1 of the present invention. As shown in FIG. 1, the image forming system 1 includes a paper feed apparatus 2, an image forming apparatus 3, an image reading apparatus 4, an electricity eliminator 5, a finisher 6, and a sheet discharger 7. The image forming system 1 incorporates a paper path 10. The paper path 10 is provided to pass a paper medium P through the paper feed apparatus 2, the image forming apparatus 3, the image reading apparatus 4, the electricity eliminator 5, the finisher 6 and the discharge unit 7

The paper feed apparatus 2 supplies a paper medium P to the image forming apparatus 3. The image forming apparatus 3 forms an image on the paper medium P which is supplied from the paper feed apparatus 2. The image forming apparatus 3 outputs, as an output sheet P', the paper medium P on which the image is formed.

The image reading apparatus 4 can be freely arranged between the image forming apparatus 3 and the finisher 6, and serves to read an image formed on the output sheet P'. The image reading apparatus 4 performs various processes based on the reading result of the output sheet P'.

The electricity eliminator 5 is located in the upstream side of the finisher 6 to apply at least one agent of water and charge to the output sheet P'.

The finisher 6 performs post-printing processes such as punching. The sheet discharger 7 is provided with a catch tray 8 to which is discharged a paper medium P which is conveyed from the finisher 6.

Figure 2:
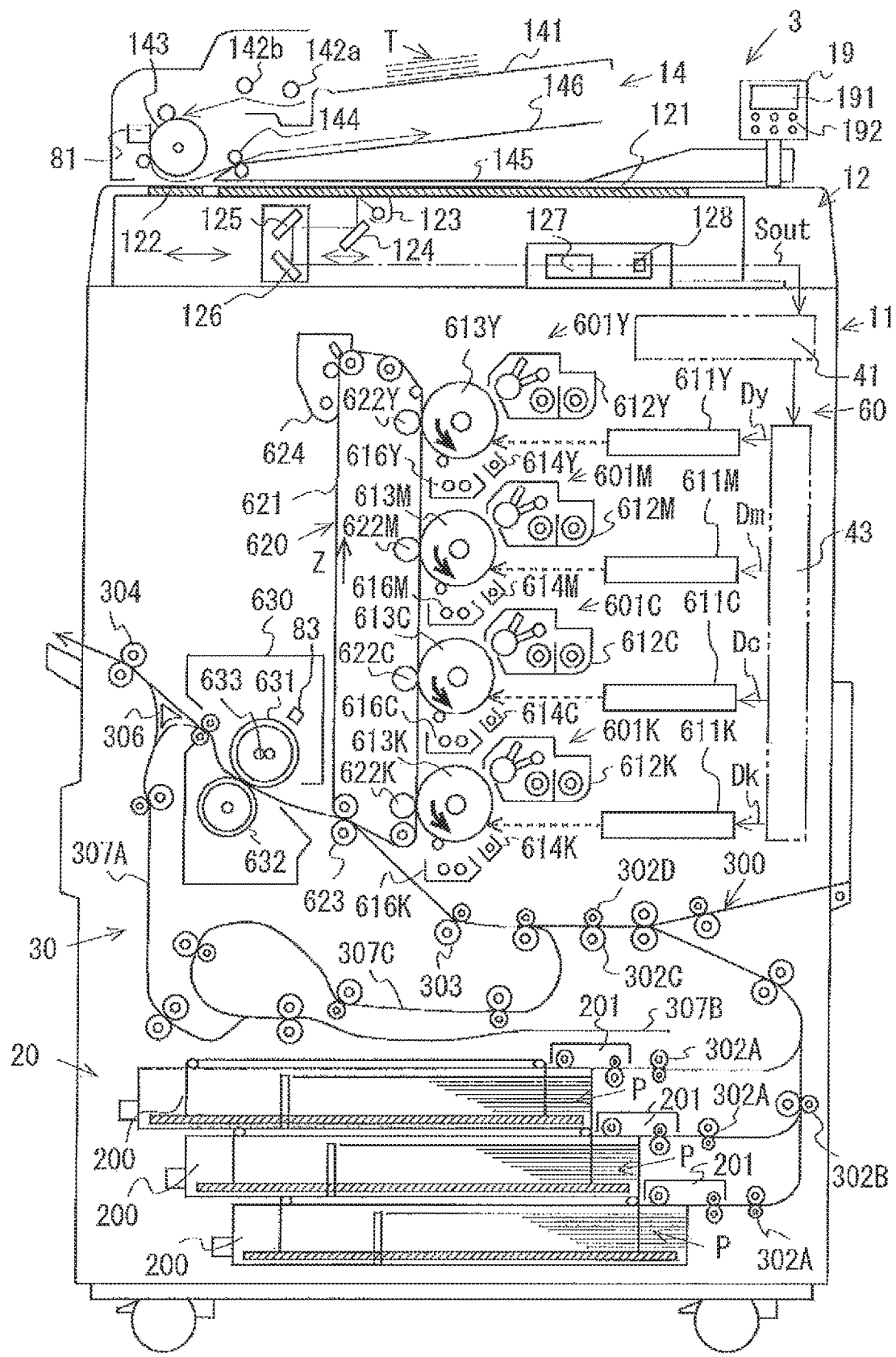
FIG. 2 is a view for showing an exemplary structure of an image forming apparatus 3 in accordance with the embodiment 1 of the present invention.

FIG. 2 is a view for showing an exemplary structure of the image forming apparatus 3 in accordance with the embodiment 1 of the present invention. As shown in FIG. 2, the image forming apparatus 3 is a type of a color copying machine. The image forming apparatus 3 acquires image information by reading images formed on an original T. The image forming apparatus 3 superimposes respective colors based on the acquired image information to form a full color image. Besides such a color copying machine, the image forming apparatus 3 can be applied to a color printer, a facsimile machine or a multi-functional peripheral thereof.

The image forming apparatus 3 is provided with an image forming apparatus body 11. A color image reading unit 12 and an automatic document feeder 14 are installed on the top of the image forming apparatus body 11. As described in detail below, the image forming apparatus body 11 includes a control unit 41, an image processing unit 43, an image forming unit 60, a paper feed unit 20 and a sheet conveyor 30.

Incidentally, the image reading unit 12 is provided with an operation panel 19. The operation panel 19 is provided with a display unit 191 and an operation unit 192 to accept user operations through the operation unit 192 and display the operation content operated through the operation unit 192 on the display unit 191.

The automatic document feeder 14 is located on the image reading unit 12 The automatic document feeder 14 performs an operation of automatically feeding one or more original T in an automatic feeding mode. The automatic feeding mode is a mode for feeding an original T placed on the automatic document feeder 14, and reading an image printed on the original T.

More specifically, the automatic document feeder 14 is provided with an original placing member 141, a roller 142*a*, a roller 142*b*, a roller 143, a roller 144, a sheet reversing member 145 and a discharge tray 146. One or more original T is placed on the original placing member 141. The roller 142*a* and the roller 142*b* are located in the downstream side of the original placing member 141. The roller 143 is located in the downstream side of the roller 142*a* and the roller 142*b*. A positioning sensor 81 is provided on the outer circumference of the roller 143.

When the automatic feeding mode is selected, an original T fed from the original placing member 141 is conveyed by the roller 143 to form a U-shaped turn. Preferably, when the automatic feeding mode is selected, an original T is placed on the original placing member 141 with its printed side facing up.

After reading by the image reading unit 12, the original T is conveyed by the roller 144 and discharged onto the discharge tray 146. Meanwhile, the automatic document feeder 14 can convey the original T through the sheet reversing member 145 to read not only the printed side of the original T but also the opposite side to the printed side of the original T with the image reading unit 12.

The positioning sensor 81 detects an original T. The positioning sensor 81 consists for example of a reflection type photosensor. The positioning sensor 81 pulls up an output signal when an original T is detected, and pulls down the output signal when the original T becomes no longer detected. The output signal is transmitted to the control unit 41. Namely, while the original T is passing through the positioning sensor 81, the output signal is maintained at a certain level.

The image reading unit 12 reads a color image formed on an original T. The image reading unit 12 is provided with a one-dimensional image sensor 128. In addition to the image sensor 128, the image reading unit 12 is further provided with a first platen glass 121, a second platen glass 122, a light source 123, mirrors 124 through 126, an image forming optical unit 127 and an optical drive unit which is not shown in the figure.

The light source 123 irradiates an original T with light. The optical drive unit not shown in the figure moves the original T or the image sensor 128 in relation to each other in the subscanning direction. Incidentally, the main scanning direction is the direction in which are arranged a plurality of light receiving devices forming the image sensor 128. On the other hand, the subscanning direction is the direction perpendicular to the main scanning direction.

An original T is conveyed by the automatic document feeder 14 and passed through an optical system of the image reading unit 12 to read an image(s) on either or both sides of the original T. Images of either or both sides of the original T are read by the image sensor 128. In a platen mode, the image sensor 128 outputs an image reading signal Sout which is obtained by reading an original T based on the RGB color model. This platen mode is a mode in which the optical drive unit not shown in the figure is driven to automatically read an image printed on an original T which is placed on a first platen glass 121.

The image sensor 128 includes three line color CCD imaging devices. Namely, the image sensor 128 consists of a plurality of light receiving element rows arranged in the main scanning direction. Specifically, read sensors which detect light corresponding to red (R), green (G) and blue (B) divide picture elements in different positions in the subscanning direction perpendicular to the main scanning direction to read optical information corresponding to red, green and blue at the same time respectively. For example, when an original T is reversed by the roller 143 as a U-shaped turn in the automatic feeding mode, the image sensor 128 reads the surface of the original T and outputs an image reading signal Sout. The image reading signal Sout is an analog signal which is obtained by photoelectrically conversion with the image sensor 128.

In other words, the image sensor 128 photoelectrically converts light which is radiated to and reflected from an image formed on a sheet. The image sensor 128 is connected to the image processing unit 43 through the control unit 41. The image reading signal Sout is output to the image processing unit 43 through the control unit 41. The image reading signal Sout is used to perform various processes with the image processing unit 43.

The image processing unit 43 is provided with an arithmetic unit such as a CPU or an integrated circuit such as an ASIC. The image processing unit 43 serves as a processor for performing various processes. For example, the image processing unit 43 performs, with the image reading signal Sout, an analog process, an A/D conversion process, a shading compensation process, an image compression process, a variable magnification process and so forth.

The image processing unit 43 converts the analog image reading signal Sout with reference to a three-dimensional color information conversion table from digital image data (R, G and B) including a color R component, a color G component and a color B component to image data Dy, Dm, Dc and Dk corresponding to color Y (yellow), color M (Magenta), color C (cyan) and color K (black) respectively. The image processing unit 43 transfers the image data (Dy, Dm, Dc and Dk) to LED writing units 611Y, 611M, 611C and 611K incorporated in the image forming unit 60.

The image forming apparatus 60 makes use of an electrophotographic process technique. The image forming unit 60 forms intermediate transfer type color images. This image forming unit 60 is based on a vertical tandem system. The image forming unit 60 is provided with image forming units 601Y, 601M, 601C and 601K corresponding to the color components respectively, the intermediate transfer unit 620, and a fixing unit 630 to form a color image based on the image data (Dy, Dm, Dc and Dk) transferred from the image processing unit 43.

The image forming unit 601Y forms an image of color Y (yellow). The image forming unit 601Y is provided with a photoreceptor drum 613Y, a charging unit 614Y, an LED writing unit 611Y, a developing unit 612Y, and a cleaning unit 616Y.

The photoreceptor drum 613Y forms a toner image of color Y. The charging unit 614Y is arranged in the vicinity of the photoreceptor drum 613Y, and uniformly charges the surface of the photoreceptor drum 613Y with negative charge by corona discharge. The LED writing unit 611Y irradiates the photoreceptor drum 613Y with light corresponding to an image of color Y component. The developing unit 612Y forms a toner image by attaching a toner of color Y component to the surface of the photoreceptor drum 613Y to visualize the electrostatic latent image. The cleaning unit 616Y removes transfer residual toner which remains on the surface of the photoreceptor drum 613Y after a first transfer process.

Incidentally, each of the image forming units 601M, 601C and 601K has the similar constituent elements and functions as the image forming unit 601Y except for the color of images to be formed, and therefore redundant description is not repeated. Meanwhile, the image forming units 601Y, 601M, 601C and 601K are collectively referred to simply as the image forming unit 601.

The intermediate transfer unit 620 is provided with an intermediate transfer belt 621, first transfer rollers 622Y, 622M, 622C and 622K, a second transfer roller 623, a belt cleaning apparatus 624 and the like.

The intermediate transfer belt 621 is made of an endless belt. A plurality of support rollers are arranged in the inner peripheral side of the endless belt. The endless belt is wound around the plurality of support rollers in the form of a loop. At least one of the plurality of support rollers consists of a drive roller, and the others consist of non-driven rollers respectively. For example, the support roller located in the downstream side of the first transfer rollers 622K for K component in the belt running direction is preferably implemented as the drive roller in this case. When the drive roller rotates, the intermediate transfer belt 621 runs at a constant speed in the direction indicated with arrow Z.

The first transfer rollers 622Y, 622M, 622C and 622K are arranged in the inner surface side of the intermediate transfer belt 621. The first transfer rollers 622Y, 622M, 622C and 622K are arranged opposed to the photoreceptor drums 613Y, 613M, 613C and 613K respectively. Namely, the first transfer rollers 622Y, 622M, 622C and 622K are urged against the photoreceptor drums 613Y, 613M, 613C and 613K respectively through the intermediate transfer belt 621. By this arrangement, first transfer nip portions are formed between the photoreceptor drums 613Y, 613M, 613C and 613K and the intermediate transfer belt 621. Toner images are transferred from the photoreceptor drums 613Y, 613M, 613C and 613K to the intermediate transfer belt 621.

Incidentally, the first transfer rollers 622Y, 622M, 622C and 622K are collectively referred to simply as the first transfer roller 622 when they need not be distinguished. Still further, the photoreceptor drums 613Y, 613M, 613C and 613K are collectively referred to simply as the photoreceptor drum 613.

The second transfer roller 623 is located in the outer surface side of the intermediate transfer belt 621. The second transfer roller 623 is located opposed to one of the plurality of support rollers. Of the plurality of support rollers, the support roller located opposite to the intermediate transfer belt 621 is called a backup roller. A second transfer nip portion is formed by urging the second transfer roller 623 against the backup roller with the intermediate transfer belt 621 therebetween. At the second transfer nip portion, toner images are transferred from the intermediate transfer belt 621 to the paper medium P.

When the intermediate transfer belt 621 is passed through the first transfer nip portions, toner images are successively transferred to the intermediate transfer belt 621 from the photoreceptor drum 613 and superimposed on the intermediate transfer belt 621 respectively as a first transfer process. More specifically, a first transfer bias voltage is applied to the first transfer roller 622 in order to charge the rear surface (which contacts the first transfer roller 622) of the intermediate transfer belt 621 with electricity of the polarity opposite to that of toner so that the toner images are electrostatically transferred to the intermediate transfer belt 621.

After transferred to the intermediate transfer belt 621, the superimposed toner image on the intermediate transfer belt 621 is transferred to the paper medium P which is passed through the second transfer nip portion as a second transfer process. More specifically, a second transfer bias voltage is applied to the second transfer roller 623 in order to charge the back side of the paper medium P, i.e. the side which contacts the second transfer roller 623, with electricity of the polarity opposite to that of toner so that the superimposed toner image is electrostatically transferred to the paper medium P. The paper medium P with the transferred toner image is conveyed to the fixing unit 630.

The belt cleaning unit 624 includes a belt cleaning blade, which is in slidable contact with the surface of the intermediate transfer belt 621, and so forth. The belt cleaning unit 624 removes toner which remains on the surface of the intermediate transfer belt 621 after the second transfer process.

Meanwhile, in the intermediate transfer unit 620, the function of the second transfer roller 623 can be implemented by an alternative structure, i.e., a so-called belt-type second transfer unit, consisting of a second transfer belt (not shown in the figure) which is wound around a plurality of support rollers including the second transfer roller 623 in the form of a loop.

The fixing unit 630 is provided with a heat roller 631, a pressure roller 632, a heating unit 633 and a temperature detection unit 83 to fix a toner image transferred by the image forming unit 60 to a paper medium P.

Specifically, the heating unit 633 is located in the heat roller 631 to intermittently heat the heat roller 631. The pressure roller 632 is located opposite to the heat roller 631 to apply a pressure to the heat roller 631. The temperature detection unit 83 is located near the heat roller 631 to detect the temperature of the heat roller 631. The sampling frequency of the temperature detection unit 83 is for example 100 ms.

The fixing unit 630 heats the heat roller 631 with the heating unit 633 in accordance with the detection result of the temperature detection unit 83. The fixing unit 630 forms a fixing nip between the heat roller 631 and the pressure roller 632 which are urged against each other.

The fixing unit 630 fixes the toner image, which is transferred by the image forming unit 60, to a paper medium P under the pressure applied by the pressure roller 632 and the heat applied through the heat roller 631. An image is printed on the paper medium P by the fixing process of the fixing unit 630.

After printing the image, the paper medium P is discharged outwards, as the output sheet P', by discharging rollers 304, and for example conveyed to the image reading apparatus 4. Incidentally, the paper medium P and the output sheet P' are collectively referred to simply as a sheet when they need not be distinguished.

The paper feed unit 20 is provided with paper feed cassettes 200, feed rollers 201 and the like. The paper feed cassette 200 accommodates sheets P. The feed rollers 201 take in the sheets P accommodated in the paper feed cassette 200 and feed the sheets P to the sheet conveyor 30.

The sheet conveyor 30 includes a conveying route 300. The sheet conveyor 30 conveys a paper medium P along the conveying route 300. The conveying route 300 is provided with paper feed rollers 302A, conveyance rollers 302B, 302C and 302D, a paper stop roller 303 and so forth.

The conveying route 300 conveys a paper medium P fed from the paper feed unit 20 to the image forming unit 60. Meanwhile, in the case where an image is to be formed also on the back side of a paper medium P, the paper medium P is conveyed through the conveying route 300 to a paper circulation route 307A by a branch section 306 after forming an image on the front side of the paper medium P. The paper medium P conveyed to the paper circulation route 307A is then conveyed from a sheet reversing route 307B to a refeeding conveying route 307C.

The control unit 41 consists mainly of a CPU, a ROM, a RAM, and an I/O interface. The CPU of the control unit 41 reads various programs from the ROM or a storage unit which is not shown in the figure in accordance with required processes, loads the programs on the RAM, and executes the loaded programs to cooperate with the control unit 41 and control the operation of each element of the image forming apparatus 3. Namely, the control unit 41 serves as a processor which performs various processes.

Figure 3:
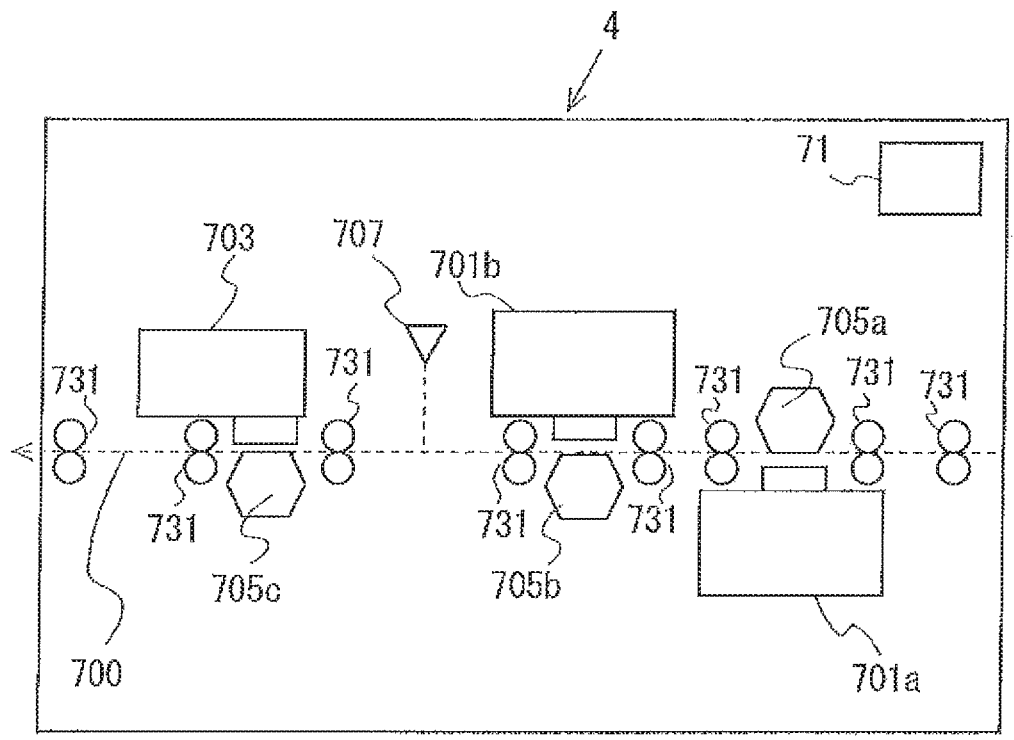
FIG. 3 is a view for showing an example of the configuration of an image reading apparatus 4 in accordance with the embodiment 1 of the present invention.

FIG. 3 is a view for showing an example of the configuration of the image reading apparatus 4 in accordance with the embodiment 1 of the present invention. The image reading apparatus 4 is configured to operate as either an in-line system or an offline system. The in-line system provides a configuration in which the image reading apparatus 4 is directly fed with the output sheet P' which is supplied from the image forming apparatus 3. On the other hand, the offline system provides a configuration in which the image forming apparatus 3 and the image reading apparatus 4 are designed independently from each other. The following explanation of the present embodiment is based on the assumption that an in-line system is used. However, an offline system can be used instead.

The image reading apparatus 4 is arranged in the downstream side of the image forming apparatus 3 and responsible for reading an image printed on one or both side of the output sheet P'. Specifically, the image reading apparatus 4 obtains correction amounts of an image printed on the output sheet P' based on the reading results such as the color, position and magnification factor of the image, and feeds back the correction amounts of the image to the image forming apparatus 3.

The image reading apparatus 4 is provided with a control unit 71, a first scanner 701a, a second scanner 701b, a spectrophotometer 703, calibration members 705a through 705c, a sheet conveyor 731, and a conveying route 700. The conveying route 700 is provided in the image reading apparatus 4, and the output sheet P' is passed therethrough. The sheet conveyor 731 are driven to convey the output sheet P' through the conveying route 700.

The image reading apparatus 4 is provided with an edge detector 707. The edge detector 707 is located between the second scanner 701b and the spectrophotometer 703 to detect the edge of the output sheet P' which is passed through the conveying route 700. The edge detector 707 is implemented with a reflection type sensor.

Receiving the output sheet P' supplied from the image forming apparatus 3, for example, the image reading apparatus 4 detects an image formed on the output sheet P' with the first scanner 701a, the second scanner 701b and the spectrophotometer 703. The detection result of the image is output to the control unit 71 of the image reading apparatus 4.

Specifically, the first scanner 701a and the second scanner 701b are arranged to face the output sheet P' which is passed through the conveying route 700. The first scanner 701a and the second scanner 701b read an image printed on the output sheet P'.

The first scanner 701a reads the back side of the output sheet P'. The reading result of the first scanner 701a is used, for example, to check misalignment between images printed on the front and back sides of the output sheet P', the existence of an extraordinary image or the like. On the other hand, the second scanner 701b reads the front side of the output sheet P'. Specifically, the second scanner 701b reads an image printed on the output sheet P' such as patches. While the output sheet P' is conveyed, the second scanner 701b reads the color of patches formed on the output sheet P' along the direction perpendicular to the moving direction of the output sheet P'.

Incidentally, the first scanner 701a and the second scanner 701b are referred to simply as the scanner 701 when they need not be distinguished. Also, the calibration members 705a to 705c are referred to simply as the calibration member 705.

The spectrophotometer 703 is arranged to face the output sheet P' passing along the conveying route 700 in the downstream side of the scanner 701. For example, the spectrophotometer 703 guarantees the absolute value of the color of an image formed on the output sheet P' by colorimetrically measuring patches printed on the output sheet P'.

Specifically, the spectrophotometer 703 radiates visible light to the patches from a light source 745 to be described below with reference to FIG. 8. The spectrophotometer 703 acquires an optical spectrum of the light reflected by the calibration member 705c. The spectrophotometer 703 derives tristimulus values (X, Y and Z) based on optical data which is obtained from the acquired optical spectrum. The spectrophotometer 703 calculates color values based on the tristimulus values (X, Y and Z). Specifically, the color values are represented in a predetermined color model such as an orthogonal coordinate system or a circular cylindrical coordinate system to derives color tones of the patches. The color values are output to the control unit 71, the control unit 41 or the image processing unit 43.

Incidentally, the colorimetric range, i.e., the viewing angle of the spectrophotometer 703 is narrower than the reading area of the scanner 701, and narrower than the width of the patches in the sheet width direction of the output sheet P'. Specifically, a lens section which receives the light reflected from the patches has, for example, a diameter of about 4 mm.

Since colorimetric measurement is performed within a limited range of viewing angle in this manner, the spectrophotometer 703 can generate color values with higher accuracy than the scanner 701.

The control unit 71 corrects the read values of patches read by the scanner 701 based on the color values of the patches measured by the spectrophotometer 703. Specifically, the image processing unit 43 associates the color values of the patches measured by the spectrophotometer 703 with the read values of the patches read by the scanner 701. Since the color values of the patches measured by the spectrophotometer 703 and the read values of the patches read by the scanner 701 are associated with each other, the colorimetrically measurement result of the spectrophotometer 703 can be reflected in the reading result of the scanner 701 to obtain an accurate correction amount.

Incidentally, the color read values of patches read by the scanner 701 can be represented by image data (R, G, B) based on the RGB color model. On the other hand, the color values of the patches measured by the spectrophotometer 703 can be represented by colorimetric values (L*, a*, b*) based on the CIELAB color space. Accordingly, the image data (R, G, B) based on the RGB color model can be associated with the colorimetric values (L*, a*, b*) based on the CIELAB color space.

The image processing unit 43 optimizes an image formed by the image forming unit 60 based on the correction amount of patches. The process of optimizing images to be performed by the image processing unit 43 includes positional adjustment of images to be printed on the front and back sides of a paper medium P, adjustment of densities and so forth.

Namely, the image processing unit 43 corrects the color, position or magnification factor of an image formed on a paper medium P in accordance with the reading result of the output sheet P' of the image reading apparatus 4. Specifically, the image processing unit 43 corrects the image formed on the paper medium P based on the corrected color values of patches. When an image is formed on a new paper medium P, the image processing unit 43 outputs, to the image forming unit 60, a command to form the image on the paper medium P.

Incidentally, the calibration member 705a is arranged to face the first scanner 701a. The calibration member 705b is arranged to face the second scanner 701b. The calibration members 705a and 705b are structured to reflect irradiation light to be radiated to the paper medium P when reading an image. The light reflecting surface of the calibration member 705 is preferably white.

Figure 4:
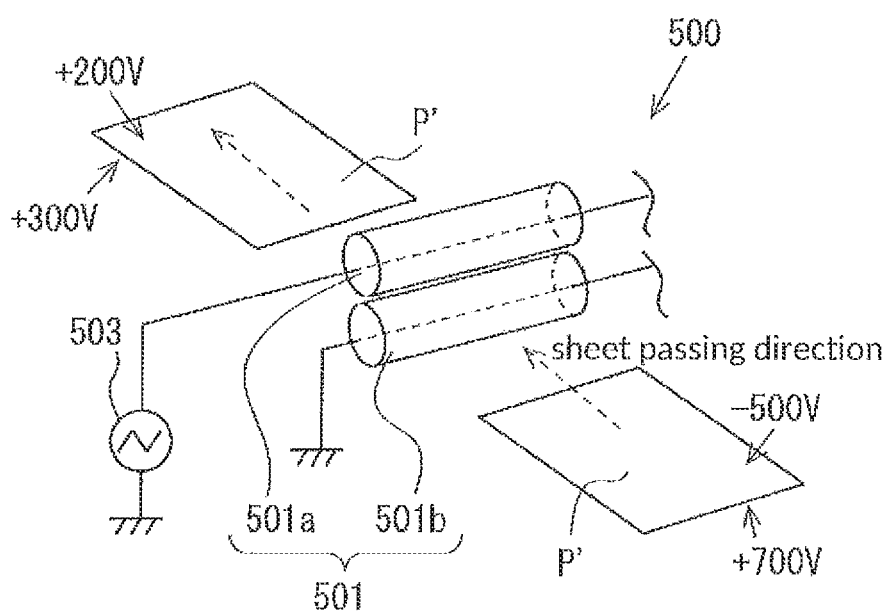
FIG. 4 is a view for showing an exemplary internal structure of a charge applicator 500 in accordance with the embodiment 1 of the present invention.

FIG. 4 is a view for showing an exemplary internal structure of the charge applicator 500 in accordance with the embodiment 1 of the present invention. As shown in FIG. 4, the charge applicator 500 is provided with a first application rollers 501a and 501b to apply a high voltage bias from a charge application power supply 503. The first application rollers 501a and 501b have longer widths in the longitudinal direction than the output sheet P' in order to apply charge to the entirety of the width of the output sheet P'. The charge application power supply 503 applies, for example, an alternating voltage. However, a direct voltage supply can be used to apply the first application rollers 501a and 501b with either a positive voltage or a negative voltage.

Before the output sheet P' reaches the first application rollers 501a and 501b, for example as illustrated in FIG. 4, the first surface of the output sheet P' is charged to −500V, and the second surface of the output sheet P' is charged to +700V. After the output sheet P' is passed through the first application rollers 501a and 501b, the first surface of the output sheet P' is charged to +200V, and the second surface of the output sheet P' is charged to +300V. The differential potential between the front and back sides of the output sheet P' is thereby reduced from 1200V to 100V, so that the sticking force between the output sheet P' of FIG. 4 and another output sheet which is not shown in FIG. 4 is decreased. Also, the first application rollers 501a and 501b are referred to simply as the first application roller 501.

Figure 5:
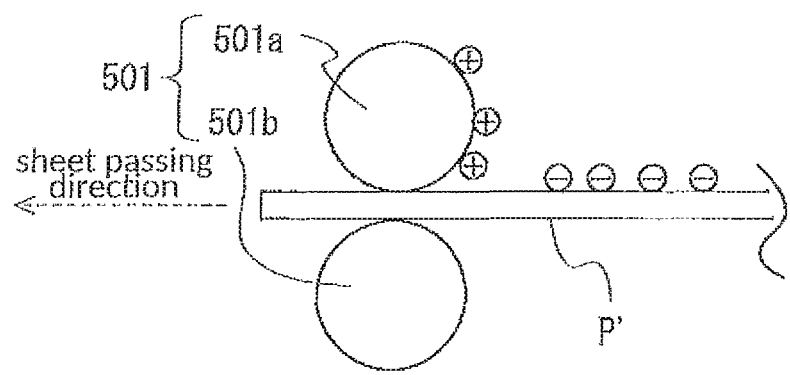
FIG. 5 is a schematic view for showing an example of charge application by a first application roller 501 in accordance with the embodiment 1 of the present invention.

FIG. 5 is a schematic view for showing an example of charge application by the first application roller 501 in accordance with the embodiment 1 of the present invention. As shown in FIG. 5, the charge applicator 500 switches charge to be applied to the pair of first application rollers 501 to either positive or negative charge.

Figure 6:
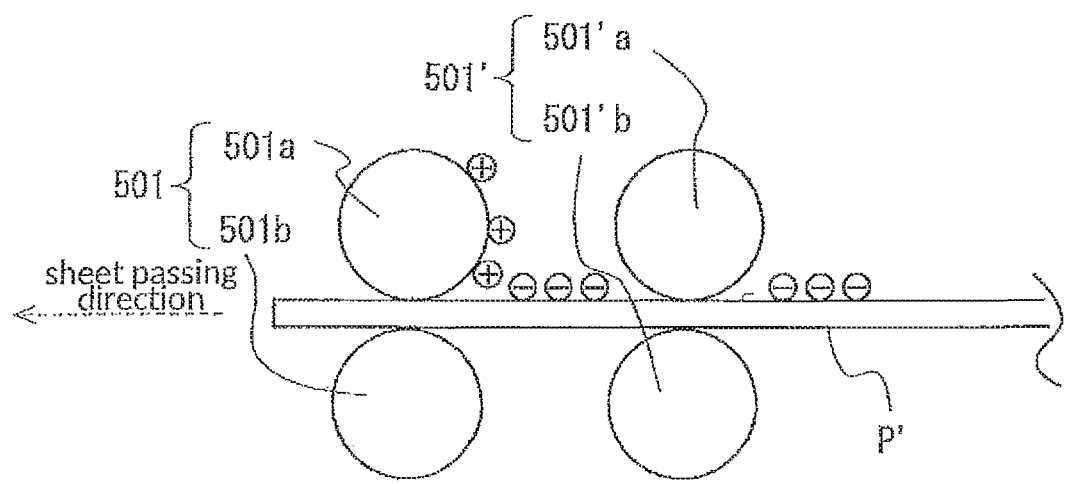
FIG. 6 is a schematic view for showing an example of charge application by the first application rollers 501 and second application rollers 501' in accordance with the embodiment 1 of the present invention.

FIG. 6 is a schematic view for showing an example of charge application by the first application rollers 501 and second application rollers 501' in accordance with the embodiment 1 of the present invention. In the example of FIG. 6, the second application rollers 501a' and 501b' are provided in addition to the first application rollers 501a and 501b. Likewise the first application roller 501, the second application rollers 501a' and 501b' are referred to simply as the second application roller 501'. As illustrated in FIG. 6, the charge applicator 500 applies a much amount of positive charge to the output sheet P' by the first application roller 501 and the second application roller 501'.

Figure 7:
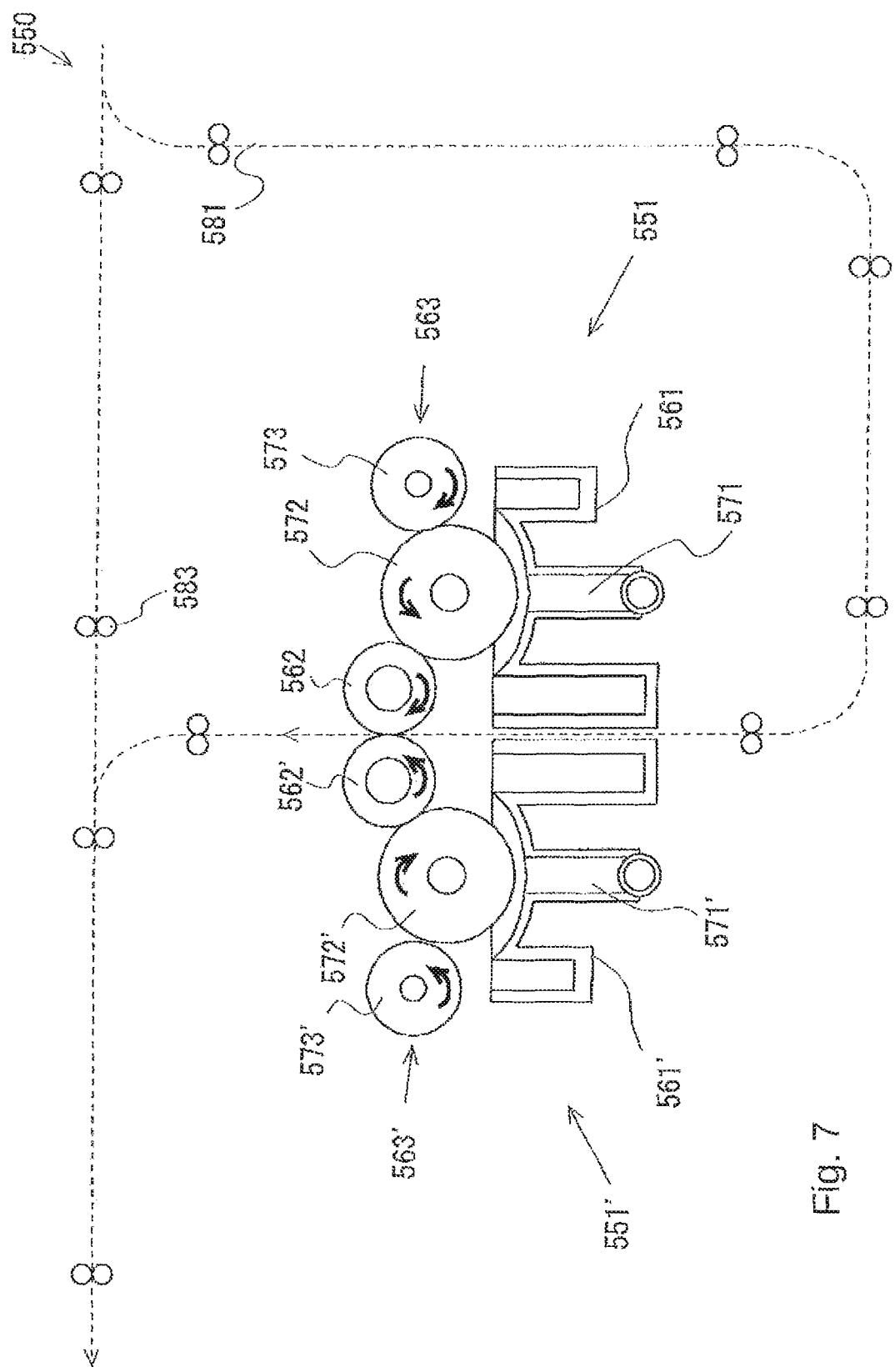
FIG. 7 is a schematic view for showing an exemplary internal structure of a humidifier 550 in accordance with the embodiment 1 of the present invention.

FIG. 7 is a view for showing an exemplary internal structure of the humidifier 550 in accordance with the embodiment 1 of the present invention. As shown in FIG. 7, the humidifier 550 includes a first humidification section 551 arranged in the right side of the inside of the housing of the humidifier 550, and a second humidification section 551' arranged in the left side of the inside of the housing of the humidifier 550. The first humidification section 551 is located to face the first surface of the output sheet P' which is passed through the paper path 581 by paper path rollers 583. The first humidification section 551 humidifies the first surface of the output sheet P'. The second surface of the output sheet P' is the opposite surface of the first surface of the output sheet P'. The second humidification section 551' humidifies the second surface of the output sheet P'.

The first humidification section 551 is provided with a first water storage section 561, a first humidifying roller 562 and a first transmission section 563. The first transmission section 563 is provided with a first water supply section 571, a first water supply roller 572 and a first drainer roller 573.

The second humidification section 551' is provided with a second water storage section 561', a second humidifying roller 562' and a second transmission section 563'. The second transmission section 563' is provided with a second water supply section 571', a second water supply roller 572' and a second drainer roller 573'.

The first water storage section 561 is connected to the first water supply section 571 and stores liquid supplied from the first water supply section 571. The first transmission section 563 transmits the liquid from the first water storage section 561 to the first humidifying roller 562. The first water supply roller 572 supplies the liquid from the first water storage section 561 to the first humidifying roller 562 through a nip portion formed between the first water supply roller 572 and the first humidifying roller 562. The first drainer roller 573 forms a nip portion with the first water supply roller 572 therebetween. The first drainer roller 573 is in pressure contact with the first water supply roller 572 through the nip portion between the first drainer roller 573 and the first water supply roller 572 to scrape a liquid layer formed on the surface of the first water supply roller 572.

The second water storage section 561' is connected to the second water supply section 571' and stores the liquid supplied from the second water supply section 571'. The second transmission section 563' transmits the liquid from the second water storage section 561' to the second humidifying roller 562'. The second water supply roller 572' supplies the liquid from the second water storage section 561' to the second humidifying roller 562'. The second drainer roller 573' forms a nip portion with the second water supply roller 572' therebetween. The second drainer roller 573' is in pressure contact with the second water supply roller 572 through the nip portion between the second drainer roller 573' and the second water supply roller 572' to scrape a liquid layer formed on the surface of the second water supply roller 572'.

Figures 8, 9:
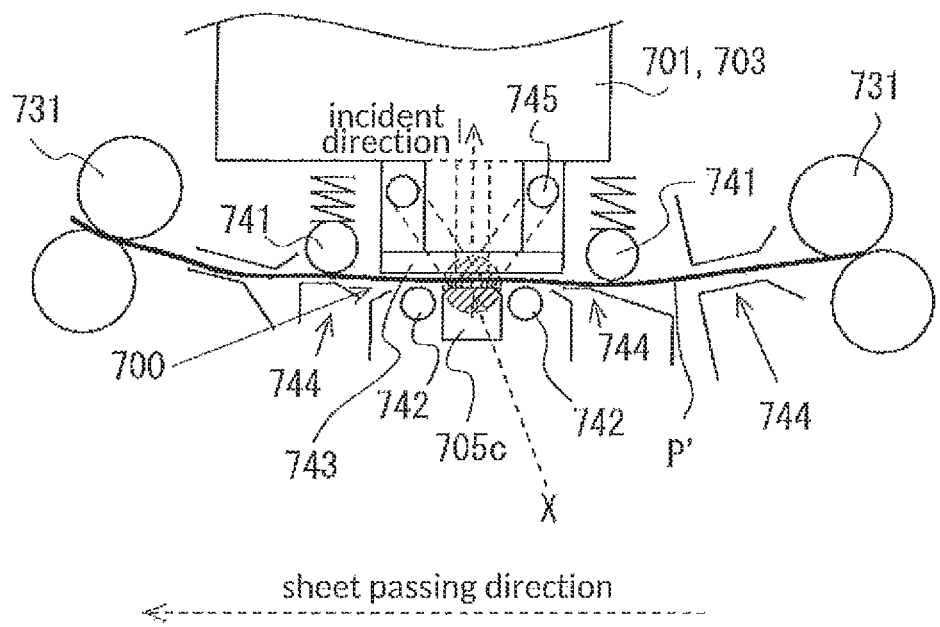
FIG. 8 is a schematic view for showing an example of a conveying route 700 which is installed in the image reading apparatus 4 in accordance with the embodiment 1 of the present invention.
FIG. 9 is a view for explaining a triboelectric charging series in accordance with the embodiment 1 of the present invention.

FIG. 8 is a schematic view for showing an example of the conveying route 700 which is installed in the image reading apparatus 4 in accordance with the embodiment 1 of the present invention. As shown in FIG. 8, the conveying route 700 is formed of paper guide members 744, movable rollers 741, fixed rollers 742, the calibration member 705c, an objective glass section 743 and so forth to pass the output sheet P' therethrough. The paper guide member 744 located in the upstream side serves to guide the output sheet P', which is conveyed from the sheet conveyor 731 in the upstream side, toward the downstream side. The movable rollers 741 can move in the vertical direction, and inhibits the output sheet P' from flapping with a resilient member. The fixed rollers 742 is located to face the objective glass section 743 to inhibit the output sheet P' from flapping. The paper guide member 744 located in the downstream side serves to guide the output sheet P', which is passed through the scanner 701 and the spectrophotometer 703, toward the sheet conveyor 731 in the downstream side. The scanner 701 and the spectrophotometer 703 read light emitted from the light source 745 and reflected from the output sheet P'.

FIG. 9 is a view for explaining a triboelectric charging series in accordance with the embodiment 1 of the present invention. The triboelectric charging is a type of contact electrification in which a certain voltage is generated between different materials by charge transfer one from the other after they come into frictional contact with each other. The triboelectric charging generates a high voltage when separating different materials from each other after frictional contact. These processes are expressed such that static electricity occurs. Also, the electricity generated by these processes is called frictional electricity.

Incidentally, triboelectric charging generates a differential potential because of positive or negative charge exchanged between materials due to the differential work function when the materials come in contact with each other. The triboelectric charging series depends on the kinds of materials. For example, in the examples as shown in FIG. 8, when the output sheet P' is conveyed with the objective glass section 743 being in contact with the output sheet P', the output sheet P' tends to be positively charged.

Namely, for the purpose of accurately reading the position and density of an image primed on the output sheet P', the scanner 701 is arranged with a narrower gap, through which the output sheet P' is passed, in a reading position X shown in FIG. 8 in order to inhibit height variation and speed variation of the output sheet P' during reading with the scanner 701. This gap is formed between one side of the objective glass section 743 and the other side of the calibration member 705c. The objective glass section 743 is made mainly of a smooth glass. Surface contact between the output sheet P' and the smooth glass may generate friction. In this case, as understood from the positions of paper and glass in the triboelectric charging series, the surface of the output sheet P' gets more positive charge than when the output sheet P' is passed through other members so that a greater attractive or repulsive force is generated by static electricity. Accordingly, there is a fear of increasing quality defects such as paper jam with scraps remaining after punching, folding position displacement due to misalignment, attachment of trimming scraps or the like during a post-printing process such as punching, folding, stitching, trimming, stacking or the like.

Meanwhile, in the case where the paper guide members 744 shown in FIG. 8 are made of a metallic plate, and the roller pair of the sheet conveyor 731, the movable rollers 741 and the fixed rollers 742 are made of a resin, since the metallic plate is ground and has an internal resistance of 0Ω, such a phenomenon that only the members made of a resin are charged happens. In practice, the internal resistance of a member depends on the material of the member.

Figure 10:
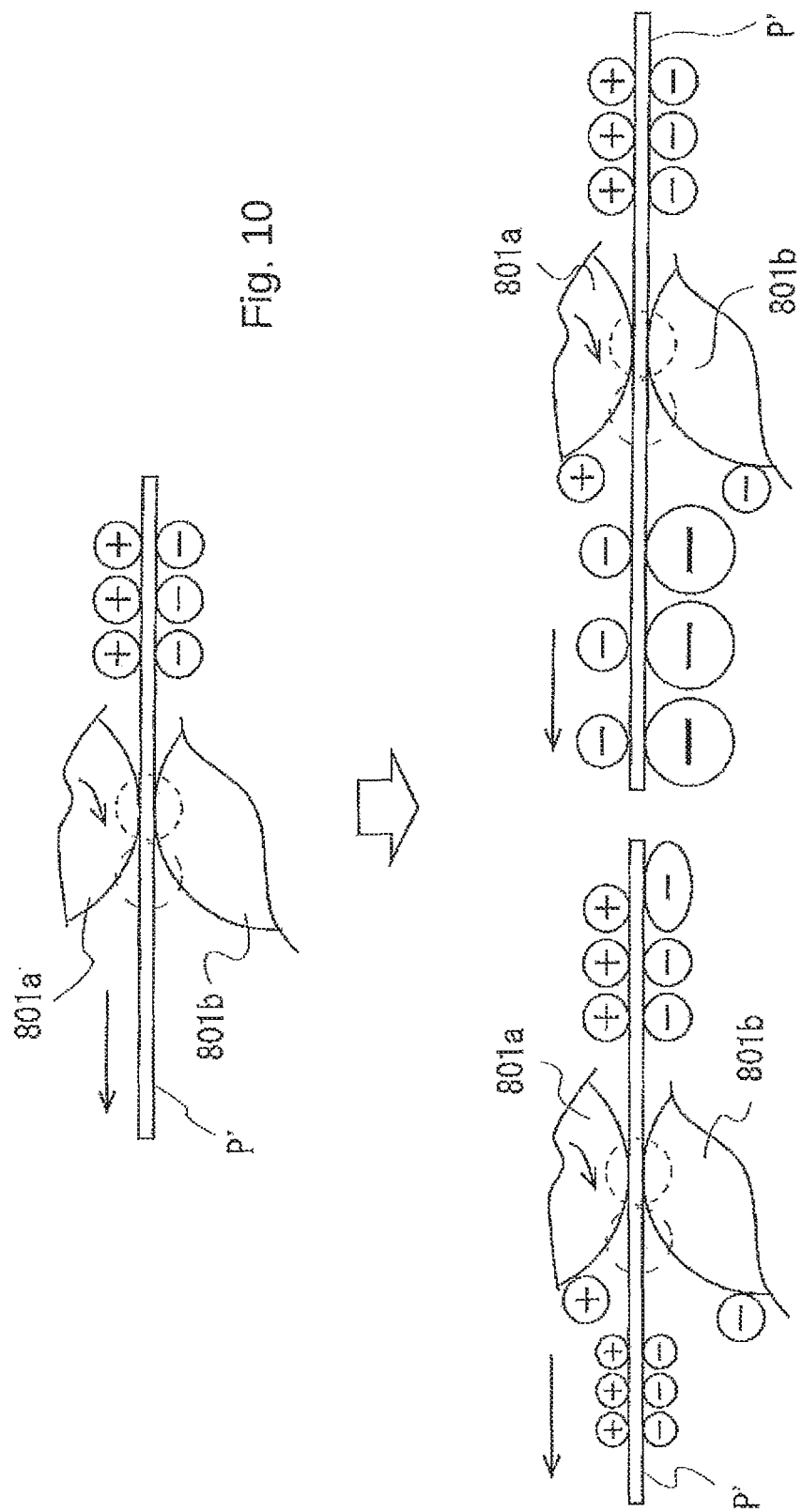
FIG. 10 is a schematic view for showing examples of peeling charge and friction charge in accordance with the embodiment 1 of the present invention.

FIG. 10 is a schematic view for showing examples of peeling charge and friction charge in accordance with the embodiment 1 of the present invention. Conveyance rollers 801a and 801b shown in FIG. 10 generally represent the various rollers which are described in the above. The conveyance rollers 801a and 801b convey the output sheet P' by applying a pressure and rotational force thereto so that a conveyance energy is determined by the pressure and rotational force. Such a conveyance energy is converted to an electric potential by friction charge. Specifically, peeling charge is generated when the output sheet P is separated from a nip portion between the conveyance roller 801a and the conveyance roller 801b. Also, friction charge is generated when the conveyance rollers 801a and 801b microslip on the output sheet P' at the nip portion between the conveyance roller 801a and the conveyance roller 801b. On the other hand, if the paper guide members 744 are made of a metal such as a metallic plate, the paper guide members 744 are ground so that charge is transferred to the paper guide members 744.

Such peeling charge, friction charge, charge transfer or the like cannot be easily controlled, but easily influenced by a temperature and a humidity environment on sheet conveying routes, the paper quality of the sheet P', the toner amount attached to the sheet P', the charged quantity of the paper guide members 744 or the like. Also, the greater the potential difference between the front and back sides of a charged output sheet P' increases, the greater the attractive force exerted between the output sheets P' increases. Accordingly, if a post-printing process is performed with the output sheets P' stuck together by the attractive force exerted therebetween, the quality of the post-printing process may be degraded. It is thereby needed to perform processes with greater energy for preventing the quality of a post-printing process from being degraded.

As explained above in the present embodiment, it is thereby possible to improve the efficiency of a series of processes and perform the series of processes in a better environment, i.e., requiring a smaller energy by applying at least one agent of water and charge to a sheet.

Figure 11:
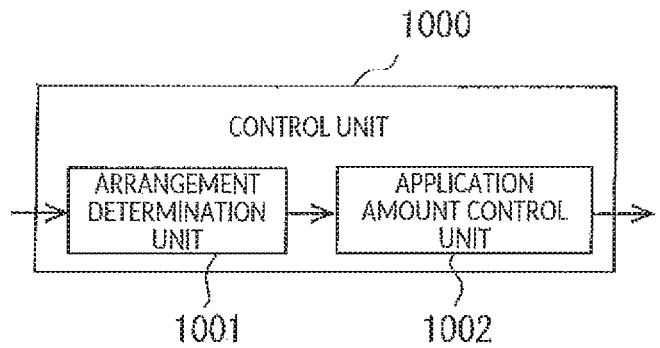
FIG. 11 is a view showing an example of a functional architecture of a control unit 1000 in accordance with the embodiment 1 of the present invention.

FIG. 11 is a view showing an example of a functional architecture of a control unit 1000 in accordance with the embodiment 1 of the present invention. The control unit 1000 shown in FIG. 11 consists mainly of a CPU, a ROM, a RAM, and an I/O interface which is not shown in the figure. The CPU of the control unit 1000 reads various programs from the ROM or a storage unit which is not shown in the figure in accordance with required processes, loads the programs on the RAM, and executes the loaded programs for cooperation and control the operation of each element of the electricity eliminator 5. In other words, the control unit 1000 functions as a hardware processor for performing carrying various processes.

The control unit 1000 is provided with an arrangement determination unit 1001 and an application amount control unit 1002. The control unit 1000 controls the agent application amount to be applied by the electricity eliminator 5 based on the amount of charge which is generated on a sheet when passing through the paper path 10.

The arrangement determination unit 1001 determines whether or not the image reading apparatus 4 is arranged between the image forming apparatus 3 and the finisher 6. The application amount control unit 1002 controls the agent application amount applied by the electricity eliminator 5 in accordance with whether or not the image reading apparatus 4 is arranged between the image forming apparatus 3 and the finisher 6. If it is determined that the image reading apparatus 4 is arranged between the image forming apparatus 3 and the finisher 6, the application amount control unit 1002 increases the agent application amount applied by the electricity eliminator 5 more than a base application amount.

Figure 12:
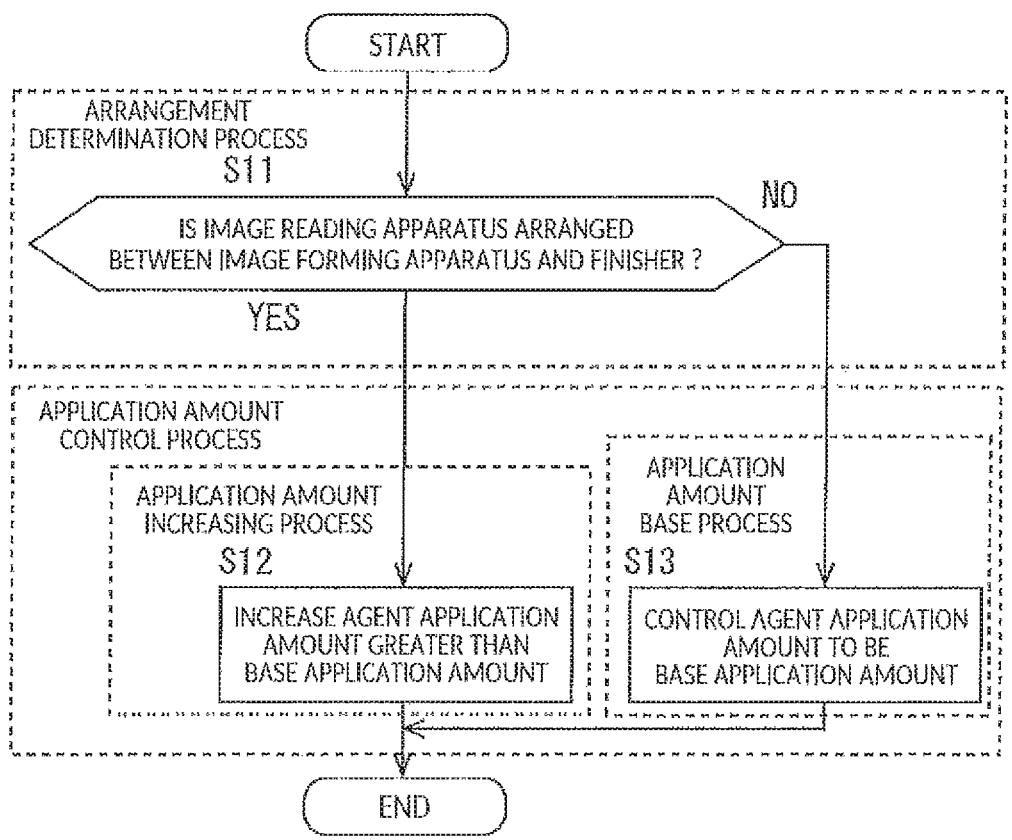
FIG. 12 is a flow chart for showing an example of control by the control unit 1000 in accordance with the embodiment 1 of the present invention.

FIG. 12 is a flow chart for showing an example of control by the control unit 1000 in accordance with the embodiment 1 of the present invention. Incidentally, the process in step S11 corresponds to an arrangement determination process performed by the arrangement determination unit 1001. The process in steps S12 and S13 corresponds to an application amount control process performed by the application amount control unit 1002. Of the application amount control process, the process in step S12 corresponds to an application amount increasing process. Of the application amount control process, the process in step S13 corresponds to an application amount base process.

In step S11, it is determined whether or not the image reading apparatus 4 is arranged between the image forming apparatus 3 and the finisher 6. If it is determined that the image reading apparatus 4 is arranged between the image forming apparatus 3 and the finisher 6, the process proceeds to step S12. Conversely, if it is not determined that the image reading apparatus 4 is arranged between the image forming apparatus 3 and the finisher 6, the process proceeds to step S13.

In step S12, the agent application amount is increased more than the base application amount. In step S13, the agent application amount is controlled to the base application amount.

As has been discussed above, in accordance with the present embodiment, the differential potential between the front and back sides of a sheet in the upstream side of the finisher 6 is controlled to decrease based on the amount of charge which is generated on a sheet when passing through the paper path 10. Accordingly, even in the case where the image reading apparatus 4 is arranged in the upstream side of the finisher 6, it is possible to prevent degradation of the quality of a post-printing process due to static electricity of a sheet.

Figure 27:
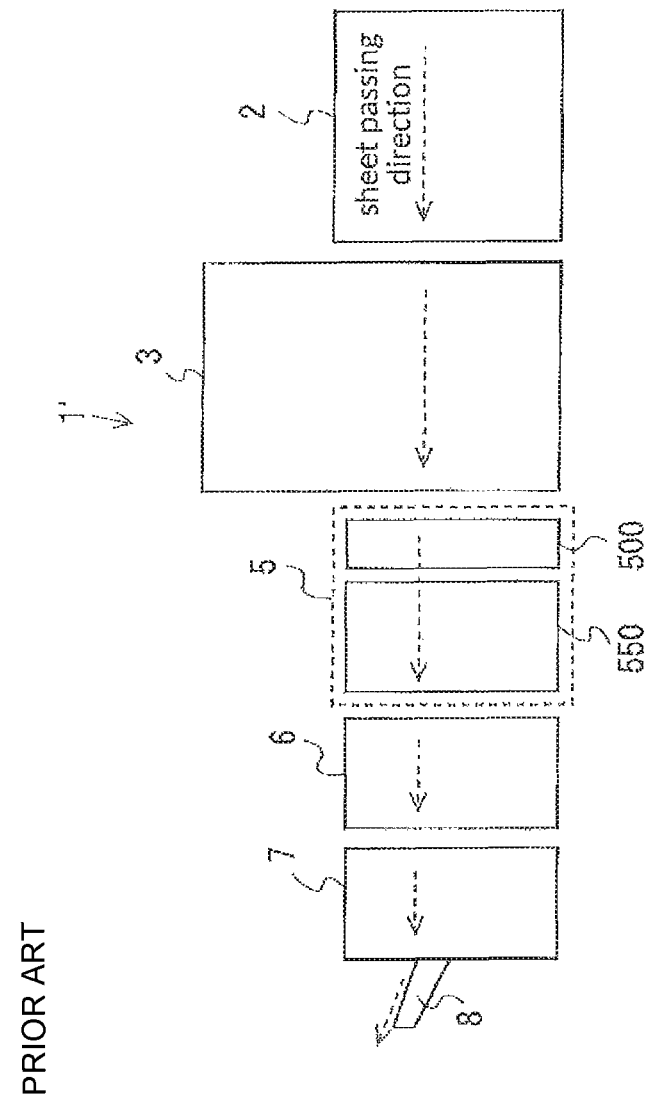
FIG. 27 is a schematic view for showing an example of the overall configuration of an image forming system 1' in accordance with a prior art.

FIG. 27 is a schematic view for showing an example of the overall configuration of an image forming system 1' in accordance with a prior art. As illustrated in FIG. 27, the image forming system 1' includes a paper feed apparatus 2, an image forming apparatus 3, an electricity eliminator 5, a finisher 6, and a sheet discharger 7. Accordingly, since the image forming system 1' is not provided with an image reading apparatus 4, this is not a system in which an image reading apparatus 4 is connected to a finisher 6. In this case, since a sheet need not be passed through a narrow gap in the image forming system 1', there is little fear that sheets are stuck together by friction charge or the like.

On the other hand, in the case of the present embodiment, as explained above, the image forming system 1 can prevent degradation of the quality of a post-printing process due to static electricity which varies depending upon whether or not the image reading apparatus 4 is arranged. Specifically, control is switched to apply a different application amount between the paper path 10 in which the image reading apparatus 4 is arranged and the paper path 10 in which the image reading apparatus 4 is not arranged. It is therefore possible to perform control in accordance with the width of the paper path 10, and apply a more appropriate agent application amount to a sheet.

Specifically, in the case where the paper path 10 is narrow, the agent application amount to be applied to a sheet is increased. Accordingly, even if the amount of charge on a sheet is increased because of the narrow paper path 10 through which the sheet is passed, it is possible to decrease the differential potential between the front and back sides of the sheet by increasing the agent application amount.

Also, in the case of the present embodiment, the control unit 1000 determines the polarity of charge to be applied to a sheet based on the relationship between the paper path 10 and the sheet with respect to the triboelectric charging series. The polarity of charge to be applied to a sheet can be changed based on the relationship between the paper path 10 and the sheet with respect to the triboelectric charging series. It is therefore possible to apply, to a sheet, charge having a polarity which is determined in accordance with the polarity of the static electricity of the sheet, by determining the polarity of charge to be applied to the sheet based on the relationship between the paper path 10 and the sheet with respect to the triboelectric charging series. Accordingly, charge on a sheet can surely be neutralized.

Embodiment 2

In this embodiment 2, similar elements are given similar references as in the embodiment 1, and therefore no redundant description is repeated. The embodiment 2 differs from the embodiment 1 in that the agent application amount is controlled in accordance with the conveying length of a sheet.

Figure 13:
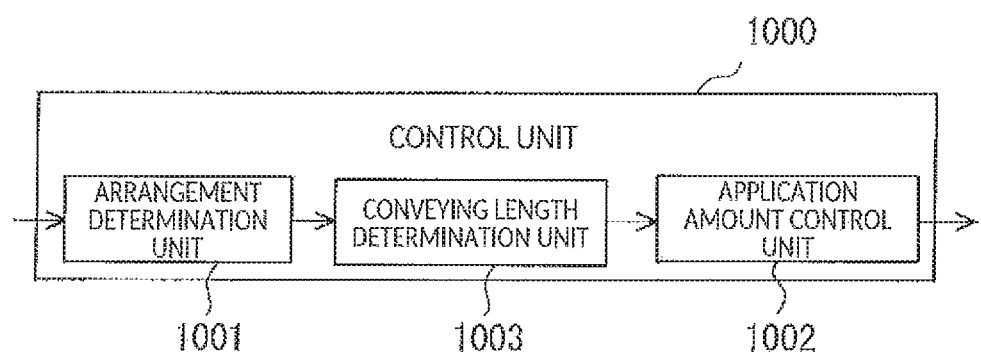
FIG. 13 is a view for showing one example of the functional configuration of the control unit 1000 in accordance with an embodiment 2 of the present invention.

FIG. 13 is a view showing one example of the functional configuration of the control unit 1000 in accordance with the embodiment 2 of the present invention. As shown in FIG. 13, the control unit 1000 is further provided with a conveying length determination unit 1003. The conveying length determination unit 1003 increases the agent application amount as the conveying length of a sheet conveyed by the sheet conveyor 731 increases along the paper path 10.

Figure 14:
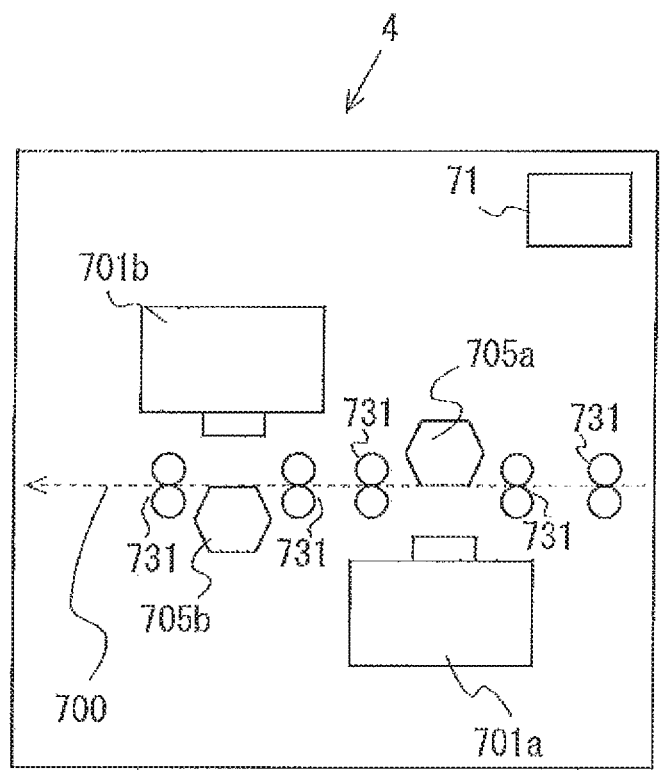
FIG. 14 is a view for showing an example of the configuration of an image reading apparatus 4 in accordance with the embodiment 2 of the present invention.

FIG. 14 is a view for showing an example of the configuration of an image reading apparatus 4 in accordance with the embodiment 2 of the present invention. The image reading apparatus 4 shown in FIG. 14 is provided with the first scanner 701a and the second scanner 701b but not provided with the spectrophotometer 703. The conveying route 700 of shown in FIG. 14 is thereby shorter than the conveying route 700 shown in FIG. 3. Accordingly, since the conveying length of a sheet shown in FIG. 14 is shorter than the conveying length of a sheet shown in FIG. 3, the agent application amount can be smaller than that in the case shown in FIG. 3.

Figure 15:
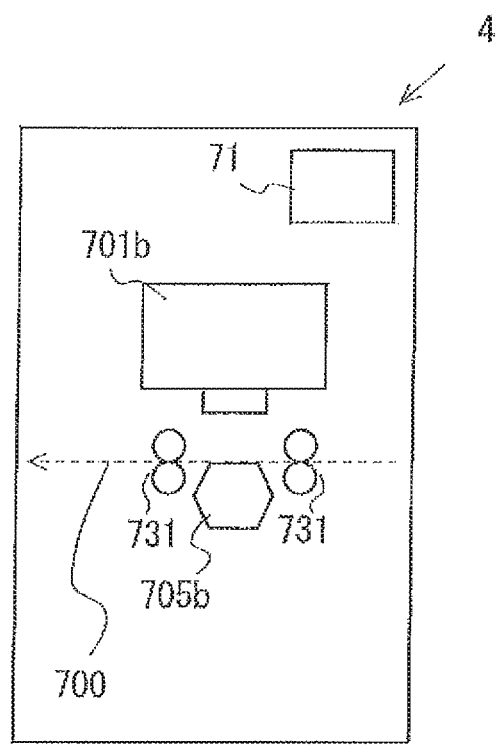
FIG. 15 is a view for showing another exemplary structure of the image reading apparatus 4 in accordance with the embodiment 2 of the present invention.

FIG. 15 is a view for showing another exemplary structure of the image reading apparatus 4 in accordance with the embodiment 2 of the present invention. The image reading apparatus 4 shown in FIG. 15 is provided with the first scanner 701a but not provided with the second scanner 701b and the spectrophotometer 703. The conveying route 700 of shown in FIG. 15 is thereby shorter than the conveying route 700 shown in FIG. 14. Accordingly, since the conveying length of a sheet shown in FIG. 15 is shorter than the conveying length of a sheet shown in FIG. 14, the agent application amount can be smaller than that in the case shown in FIG. 14.

Figure 16:
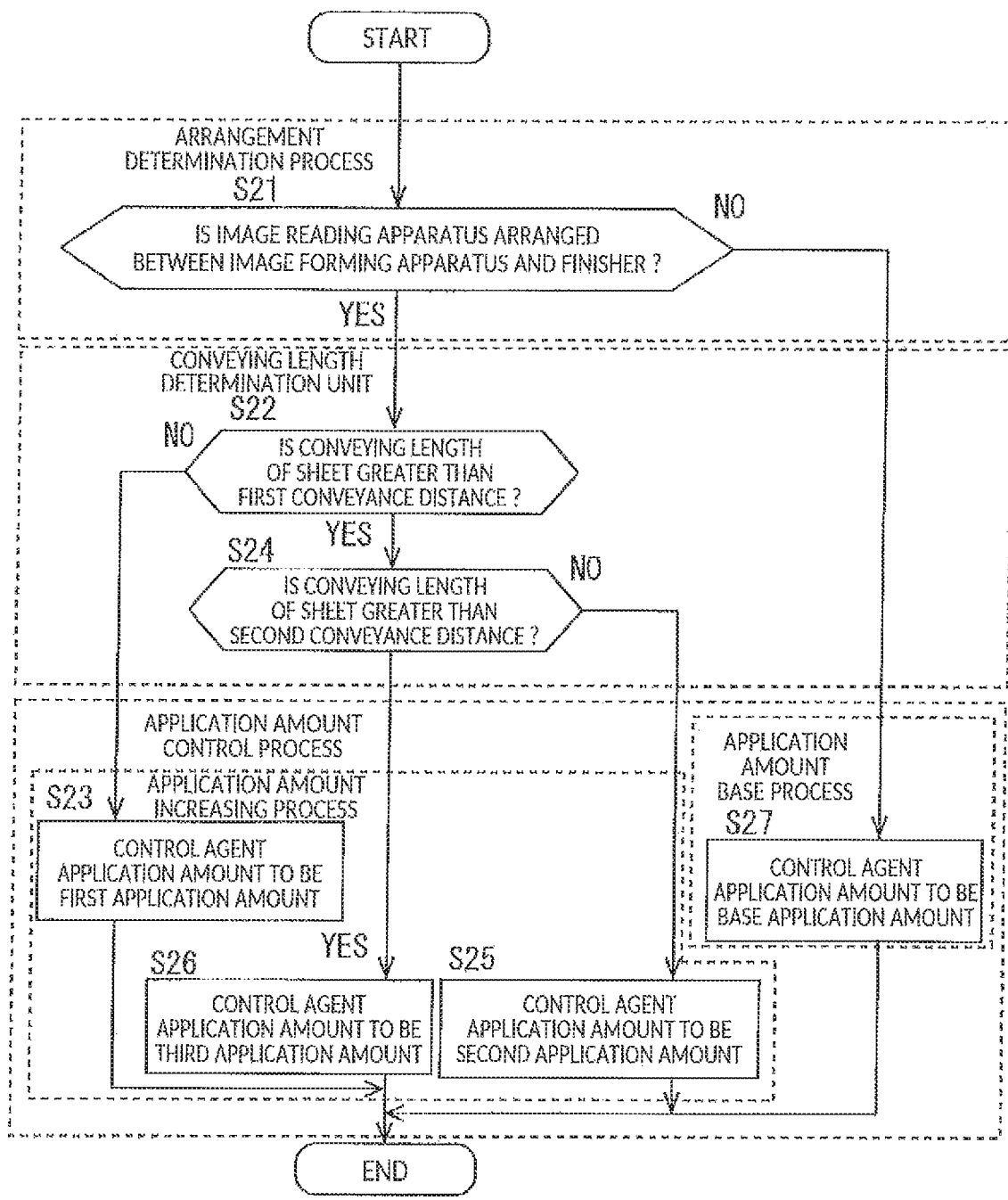
FIG. 16 is a flow chart for explaining an example of control by the control unit 1000 in accordance with the embodiment 2 of the present invention.

FIG. 16 is a flow chart for explaining an example of control by the control unit 1000 in accordance with the embodiment 2 of the present invention. Meanwhile, the conveying route 700 as explained above is included in the paper path 10. Also, the process in step S21 corresponds to an arrangement determination process performed by the arrangement determination unit 1001. The process in steps S22 and S24 corresponds to a conveying length determination process performed by the conveying length determination unit 1003. The process in steps S23, S25, S26 and S27 corresponds to an application amount control process performed by the application amount control unit 1002. Of the application amount control process, the process in steps S23, S25 and S26 corresponds to an application amount increasing process. Of the application amount control process, the process in step S27 corresponds to an application amount base process.

In step S21, it is determined whether or not the image reading apparatus 4 is arranged between the image forming apparatus 3 and the finisher 6. If it is determined that the image reading apparatus 4 is arranged between the image forming apparatus 3 and the finisher 6, the process proceeds to step S22. Conversely, if it is not determined that the image reading apparatus 4 is arranged between the image forming apparatus 3 and the finisher 6, the process proceeds to step S27.

In step S22, it is determined whether or not the conveying length of a sheet is greater than a first conveyance distance. The first conveyance distance is set, for example, based on the conveying route 700 shown in FIG. 15. If it is determined that the conveying length of a sheet is greater than the first conveyance distance, the process proceeds to step S24. Conversely, if it is not determined that the conveying length of a sheet is greater than the first conveyance distance, the process proceeds to step S23.

In step S23, the agent application amount is controlled to be a first application amount. The first application amount is set, for example, based on the amount of charge which is generated on a sheet when passing through the conveying route 700 of FIG. 15.

In step S24, it is determined whether or not the conveying length of a sheet is greater than a second conveyance distance. The second conveyance distance is set, for example, based on the conveying route 700 shown in FIG. 14. If it is determined that the conveying length of a sheet is greater than the second conveyance distance, the process proceeds to step S26. Conversely, if it is not determined that the conveying length of a sheet is greater than the second conveyance distance, the process proceeds to step S25.

In step S25, the agent application amount is controlled to be a second application amount. The second application amount is set, for example, based on the amount of charge which is generated on a sheet when passing through the conveying route 700 of FIG. 14.

In step S26, the agent application amount is controlled to be a third application amount. The third application amount is set, for example, based on the amount of charge which is generated on a sheet when passing through the conveying route 700 of FIG. 3.

In step S27, the agent application amount is controlled to be the base application amount. The base application amount is set, for example, based on the amount of charge which is generated on a sheet when passing through the paper path shown in FIG. 27.

As explained above, in the case of the present embodiment, the agent application amount to be applied to a sheet is increased as the distance through which the sheet is passed in the paper path 10 increases. Since the paper path 10 becomes narrow when a sheet is passed through the image reading apparatus 4, the sheet is likely to come in contact with the paper path 10. There is a high chance that the amount of charge generated on a sheet is increased when the sheet is passing through the image reading apparatus 4. Accordingly, since the agent application amount is increased as the amount of charge generated on a sheet increases, even if the image reading apparatus 4 is large, the application amount can be controlled in accordance with the size of the image reading apparatus 4.

Embodiment 3

In this embodiment 3, similar elements are given similar references as in the embodiment 1 and the embodiment 2, and therefore no redundant description is repeated. The embodiment 3 differs from the embodiments 1 and 2 in that the agent application amount is controlled based on the content of a job.

Figure 17:
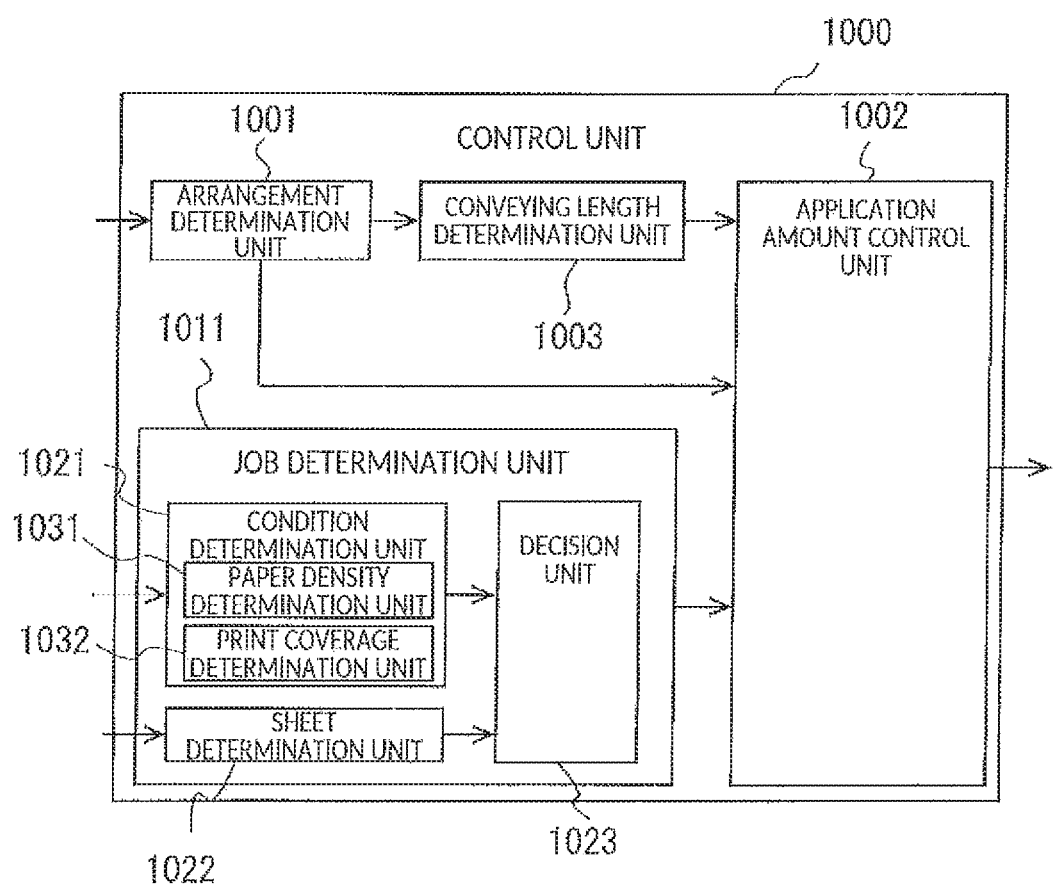
FIG. 17 is a view showing an example of a functional architecture of a control unit 1000 in accordance with an embodiment 3 of the present invention.

FIG. 17 is a view showing an example of a functional architecture of a control unit 1000 in accordance with the embodiment 3 of the present invention. As shown in FIG. 17, the control unit 1000 is further provided with a job determination unit 1011. The job determination unit 1011 controls the agent application amount based on the job content of the image forming apparatus 3. The job determination unit 1011 is provided with a condition determination unit 1021, a sheet determination unit 1022 and a decision unit 1023. The condition determination unit 1021 or the sheet determination unit 1022 determines image formation conditions relating to a job content.

The decision unit 1023 determines an agent application amount based on the image formation conditions relating to a job content determined by the condition determination unit 1021 or the sheet determination unit 1022.

The condition determination unit 1021 is provided with a paper density determination unit 1031. The paper density determination unit 1031 determines a paper density as one of the image formation conditions. The decision unit 1023 decides the agent application amount in order that the agent application amount is increased as the paper density which is one of the image formation conditions increases. The condition determination unit 1021 is also provided with a print coverage determination unit 1032. The print coverage determination unit 1032 determines a print coverage of an image formed on a sheet as one of the image formation conditions. The decision unit 1023 decides the agent application amount in order that the agent application amount is increased as the print coverage of an image formed on a sheet which is one of the image formation conditions increases.

The sheet determination unit 1022 determines the type of a sheet relating to the job content. The decision unit 1023 determines the agent application amount in accordance with the type of a sheet relating to the job content. When the sheet determination unit 1022 determines that the type of a sheet is at least one of a coated paper and a thick paper, the decision unit 1023 decides the agent application amount in order that the agent application amount is increased more than the base application amount. When the sheet determination unit 1022 determines that the type of a sheet is a thick paper, the decision unit 1023 decides the agent application amount in order that the agent application amount is increased as the thickness of the sheet increases. When the sheet determination unit 1022 determines that the type of a sheet is a thin paper, the decision unit 1023 decides the agent application amount to be the base application amount. Incidentally, the arrangement determination unit 1001 determines that the image reading apparatus 4 is not arranged between the image forming apparatus 3 and the finisher 6, the application amount control unit 1002 decides the agent application amount to be the base application amount.

Figure 18:
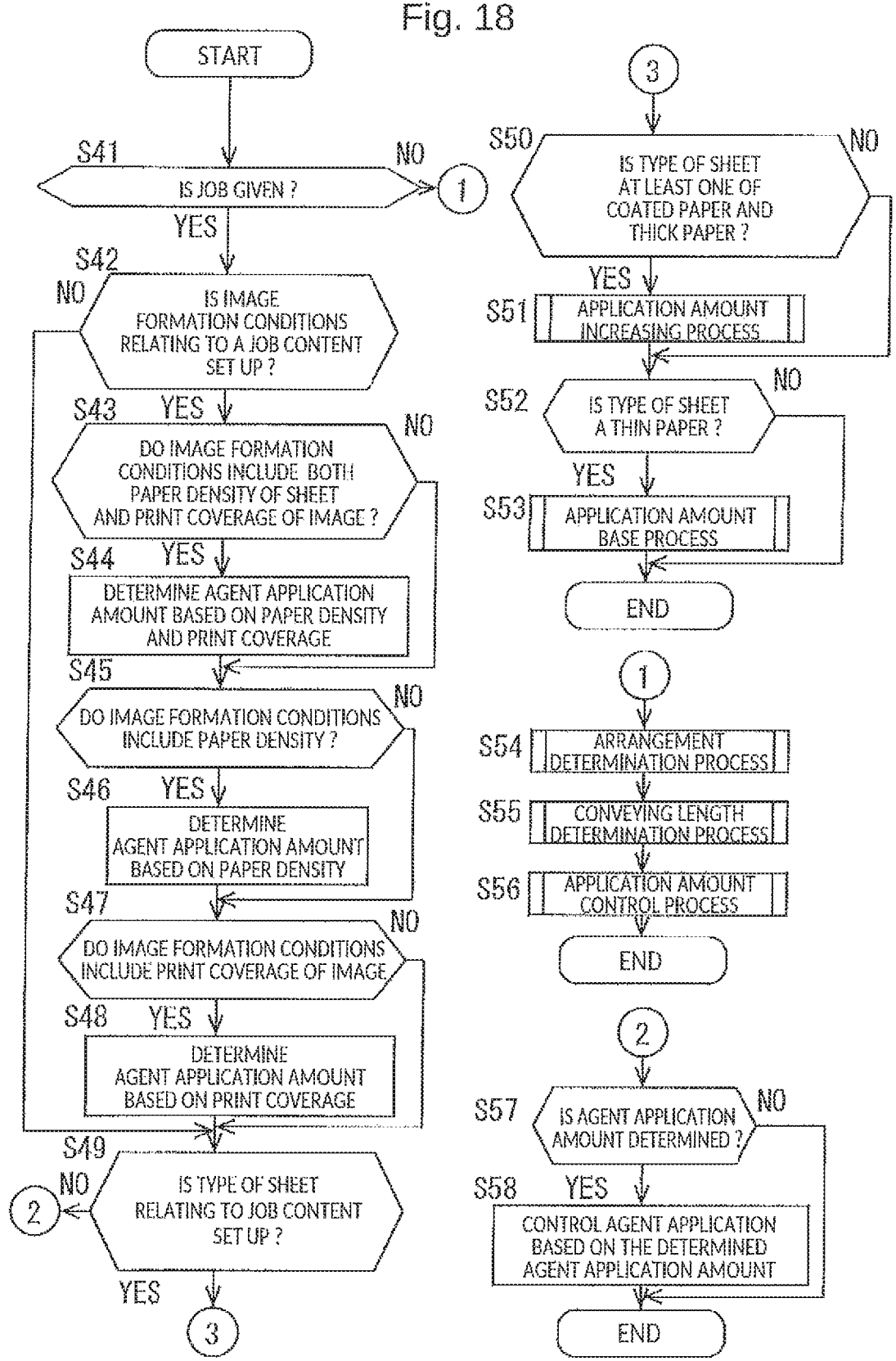
FIG. 18 is a flow chart for explaining an example of control by the control unit 1000 in accordance with the embodiment 3 of the present invention.

FIG. 18 is a flow chart for explaining an example of control by the control unit 1000 in accordance with the embodiment 3 of the present invention.

In step S41, it is determined whether or not a job is given. If it is determined that a job is given, the process proceeds to step S42. Conversely, if it is not determined that a job is given, the process proceeds to step S54.

In step S42, it is determined whether or not image formation conditions relating to a job content have been set up. If it is determined that image formation conditions relating to a job content have been set up, the process proceeds to step S43. Conversely, it is not determined that image formation conditions relating to a job content have been set up, the process proceeds to step S49.

In step S43, it is determined whether or not the image formation conditions include both a paper density of a sheet and a print coverage of an image. If it is determined that the image formation conditions include both a paper density of a sheet and a print coverage of an image, the process proceeds to step S44. Conversely, if it is not determined that the image formation conditions include both a paper density and a print coverage of an image, the process proceeds to step S45.

In step S44, an agent application amount is determined based on the paper density and the print coverage. In step S45, it is determined whether or not the image formation conditions include a paper density. If it is determined that the image formation conditions include a paper density, the process proceeds to step S46. Conversely, if it is not determined that the image formation conditions include a paper density, the process proceeds to step S47.

In step S46, an agent application amount is determined based on the paper density. In step S47, it is determined whether or not the image formation conditions include a print coverage of an image. If it is determined that the image formation conditions include a print coverage of an image, the process proceeds to step S48. Conversely, if it is not determined that the image formation conditions include a print coverage of an image, the process proceeds to step S49.

In step S48, an agent application amount is determined based on the print coverage. In step S49, it is determined whether or not the type of a sheet relating to the job content is set up. If it is determined that the type of a sheet relating to the job content is set up, the process proceeds to step S50. Conversely, if it is not determined that the type of a sheet relating to the job content is set up, the process proceeds to step S57.

In step S50, it is determined whether or not the type of a sheet is at least one of a coated paper and a thick paper. If it is determined that the type of a sheet is at least one of a coated paper and a thick paper, the process proceeds to step S51. Conversely, if it is not determined that the type of a sheet is at least one of a coated paper and a thick paper, the process proceeds to step S52.

In step S51, an application amount increasing process is performed. This application amount increasing process in step S51 corresponds to the application amount increasing process shown in FIG. 12 including step S12. In step S52, it is determined whether or not the type of a sheet is a thin paper. If it is determined that the type of a sheet is a thin paper, the process proceeds to step S53. Conversely, it is not determined that the type of a sheet is a thin paper, the process is terminated. In step S53, an application amount base process is performed. This application amount base process in step S53 corresponds to the application amount base process shown in FIG. 12 including step S13.

In step S54, an arrangement determination process is performed. This arrangement determination process in step S54 corresponds to the arrangement determination process shown in FIG. 16 including step S21. In step S55, a conveying length determination process is performed. This conveying length determination process in step S55 corresponds to the conveying length determination process shown in FIG. 16 including steps S22 and S24. In step S56, an application amount control process is performed. This application amount control process in step S56 corresponds to the application amount control process shown in FIG. 16 including steps S23 and S25 to S27.

In step S57, it is determined whether or not an agent application amount is determined. If it is determined that an agent application amount is determined, the process proceeds to step S58. Conversely, if it is not determined that an agent application amount is determined, the process is terminated.

In step S58, agent application is controlled based on the determined agent application amount, and the process is then terminated.

As has been discussed above, in accordance with the present embodiment, the control unit 1000 controls an agent application amount based on a job content of the image forming apparatus 3. A print job includes information about a sheet and information about an image to be formed on a sheet. There is a correlation between the amount of charge on a sheet, and the sheet and the image formed on the sheet. Accordingly, if the agent application amount is controlled based on a job content, it means that the agent application amount is controlled based on a sheet and the image formed on the sheet. Namely, since the agent application amount to be applied to a sheet is controlled in correspondence with the sheet and the image, the static electricity on the sheet can be eliminated in accordance with the amount of charge on the sheet.

Also, the control unit 1000 determines an agent application amount based on the image formation conditions relating to a job content. The image formation conditions are conditions for forming an image on a sheet. The agent application amount to be applied to a sheet is thereby determined in correspondence with an image to be formed on the sheet. Also, the amount of charge on a sheet varies depending upon the amount of toner attached to the sheet. The amount of toner attached to a sheet varies depending upon the image formed on the sheet. Namely, since the agent application amount to be applied to a sheet is determined in accordance with the amount of toner attached to the sheet, the static electricity on the sheet can be eliminated in accordance with the amount of charge on the sheet.

Furthermore, the control unit 1000 increases the agent application amount as the paper density which is one of the image formation conditions increases. The greater the paper density of a sheet increases, the more the amount of toner and the amount of water can be contained in the sheet. The greater the amount of toner attached to a sheet increases, the more the charge on the sheet increases. Accordingly, it is estimated that the greater the paper density of a sheet increases, the more the charge on the sheet increases. In other words, by increasing the agent application amount to be applied to a sheet in accordance with the estimated increase in the amount of charge on the sheet, the static electricity on a sheet can be eliminated in accordance with the estimated amount of charge on the sheet.

Also, the control unit 1000 increases the agent application amount as the print coverage of an image formed on a sheet which is one of the image formation conditions increases. The amount of toner attached to a sheet increases as the print coverage of an image formed on the sheet increases, and thereby a toner layer formed on the sheet becomes thick. It is estimated that as a toner layer formed on the sheet becomes thick, the charge on the sheet increases. In other words, since the agent application amount to be applied to a sheet can be increased in accordance with the estimated increase in the amount of charge on the sheet by increasing the agent application amount to be applied to the sheet in accordance with the increase in the print coverage, the static electricity on a sheet can be eliminated in accordance with the estimated amount of charge on the sheet.

Also, the control unit 1000 determines an agent application amount in accordance with the type of a sheet relating to a job content. The amount of charge on a sheet varies depending upon the type of the sheet. It is therefore possible to control the agent application amount to be applied to a sheet in a more appropriate manner by controlling the agent application amount to be applied to the sheet in accordance with the type of the sheet.

Furthermore, if it is determined that the type of a sheet is at least one of a coated paper and a thick paper, the control unit 1000 increases the agent application amount more than the base application amount. When the type of a sheet is at least one of a coated paper and a thick paper, the amount of toner which can be contained in the sheet increases. It is estimated that the amount of charge on a sheet increases as the amount of toner increases. In other words, when the type of a sheet is at least one of a coated paper and a thick paper, since the agent application amount to be applied to the sheet can be increased in accordance with the estimated increase in the amount of charge on the sheet by increasing the agent application amount to be applied to the sheet, the static electricity on a sheet can be eliminated in accordance with the estimated amount of charge on the sheet.

Also, the control unit 1000 increases the agent application amount as the type of a sheet is a thick paper and the thickness of the sheet increases. The amount of toner attached to a sheet increases as the thickness of the sheet increases, and thereby a toner layer formed on the sheet becomes thick. It is estimated that as a toner layer formed on the sheet becomes thick, the charge on the sheet increases. Accordingly, since the agent application amount to be applied to a sheet can be increased in accordance with the estimated increase in the amount of charge on the sheet by increasing the agent application amount to be applied to the sheet in accordance with the increase in the print coverage, the static electricity on a sheet can be eliminated in accordance with the estimated amount of charge on the sheet.

Also, if it is determined that the type of a sheet is a thin paper or that the image reading apparatus 4 is not arranged between the image forming apparatus 3 and the finisher 6, the control unit 1000 decides the agent application amount to be the base application amount. When a thin paper is used, the sheet is not likely to come in contact with the paper path 10, and thereby the sheet tends not to be charged by friction. Furthermore, in the case where the image reading apparatus 4 is not arranged, the paper path 10 is not narrow. In this case, therefore, like a thin paper, the sheet is not likely to come in contact with the paper path 10, and thereby the sheet tends not to be charged by friction. Accordingly, in the above cases, there was little necessity to increase the agent application amount to be applied to the sheet, and thereby the agent application amount can be controlled to be the base application amount. As a result, it is possible to shorten the time required for conveying a sheet to the finisher 6.

Embodiment 4

In this embodiment 4, similar elements are given similar references as in the embodiments 1 through 3, and therefore no redundant description is repeated. The embodiment 4 differs from the embodiments 1 through 3 in that processing is performed in accordance with function units which are implemented in the image forming system 1.

Figure 19:
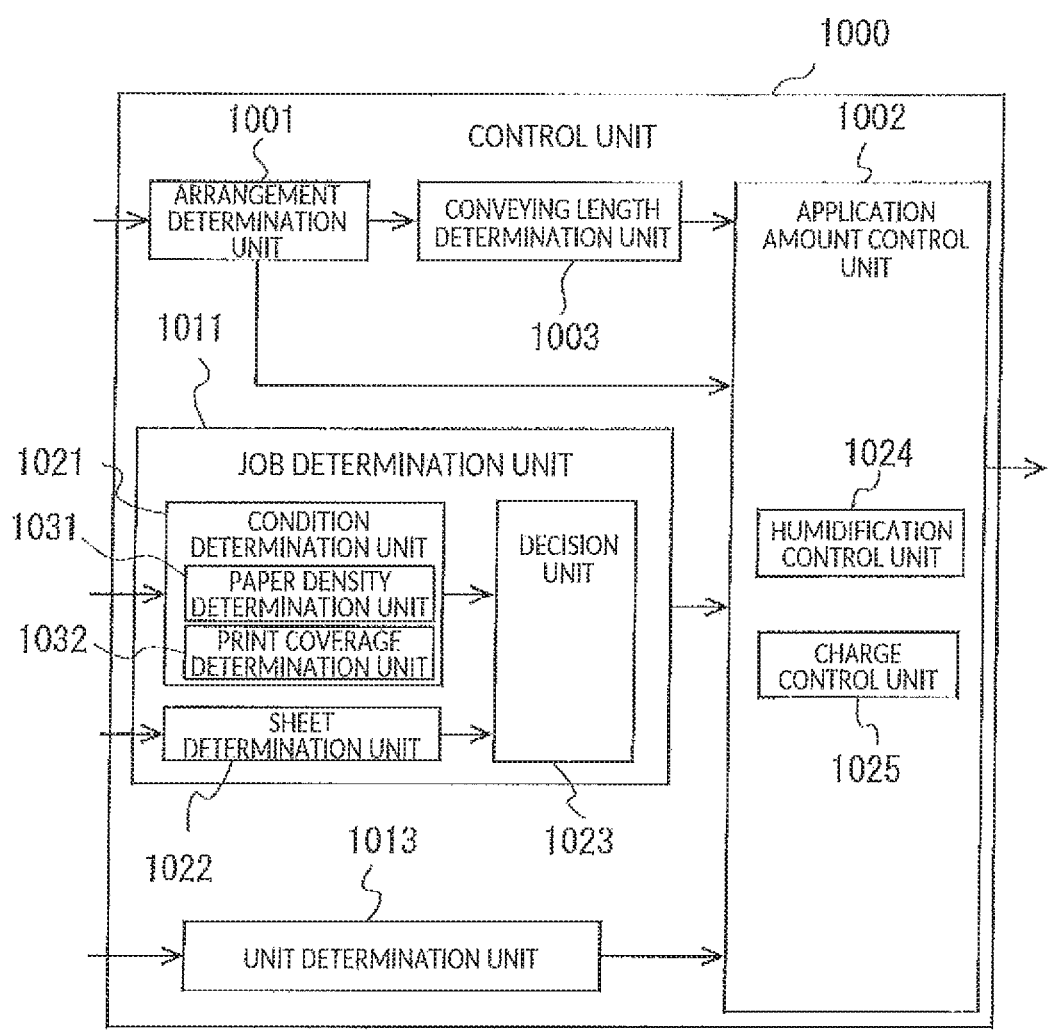
FIG. 19 is a view showing an example of a functional architecture of a control unit 1000 in accordance with an embodiment 4 of the present invention.

FIG. 19 is a view showing an example of a functional architecture of a control unit 1000 in accordance with the embodiment 4 of the present invention. As shown in FIG. 19, the control unit 1000 is provided further with a unit determination unit 1013. The unit determination unit 1013 determines function units implemented between the image forming apparatus 3 and the finisher 6. The function unit is a unit in which a various function is implemented. Actual examples include the humidifier 550 and the charge applicator 500.

The humidifier 550 can be freely arranged between the image forming apparatus 3 and the finisher 6. The humidifier 550 applies water to the front and back sides of a sheet. The charge applicator 500 can be freely arranged between the image forming apparatus 3 and the finisher 6 in the same manner as the humidifier 550. The charge applicator 500 applies charge to the front and back sides of a sheet.

The application amount control unit 1002 is further provided with a humidification control unit 1024 and a charge control unit 1025. When the unit determination unit 1013 determines that the humidifier 550 is implemented as the function unit, the humidification control unit 1024 increases the amount of water applied to a sheet more than a base water amount. Incidentally, when the unit determination unit 1013 determines that the humidifier 550 is implemented as the function unit, the humidification control unit 1024 may lower the conveying speed of a sheet, to which water is applied, than a base conveying speed. When the unit determination unit 1013 determines that the charge applicator 500 is implemented as the function unit, the charge control unit 1025 increases the amount of charge applied to a sheet more than a base charge amount.

Figure 20:
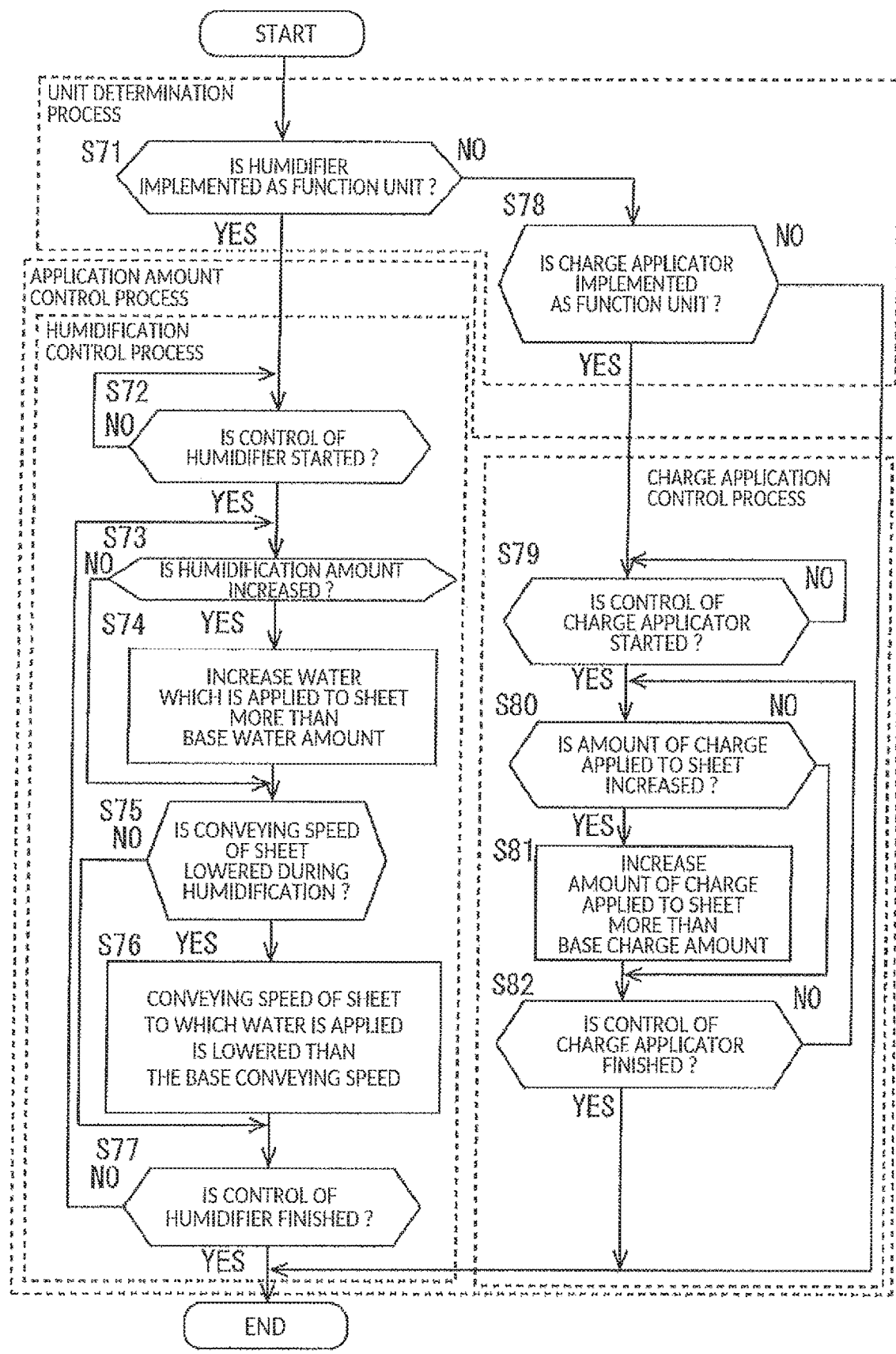
FIG. 20 is a flow chart for explaining an example of control by the control unit 1000 in accordance with the embodiment 4 of the present invention.

FIG. 20 is a flow chart for explaining an example of control by the control unit 1000 in accordance with the embodiment 4 of the present invention. Incidentally, the process in steps S71 and S78 is a unit determination process. The process in steps S72 to S77 and S79 to S82 is an application amount control process. Of the application amount control process, the process in steps S72 to S77 is a humidification control process. Of the application amount control process, the process in steps S79 to S82 is a charge application control process.

In step S71, it is determined whether or not the humidifier 550 is implemented as the function unit.

If it is determined that the humidifier 550 is implemented as the function unit, the process proceeds to step S72. Conversely, if it is not determined that the humidifier 550 is implemented as the function unit, the process proceeds to step S78.

In step S72, it is determined whether or not control of the humidifier 550 is started. If it is determined that control of the humidifier 550 is started, the process proceeds to step S73. Conversely, it is not determined that control of the humidifier 550 is started, the process stands by in step S72.

In step S73, it is determined whether or not a humidification amount is increased. If it is determined whether or not a humidification amount is increased, the process proceeds to step S74. Conversely, if it is not determined whether or not a humidification amount is increased, the process proceeds to step S75.

In step S74, water applied to a sheet is increased more than the base water amount. In step S75, it is determined whether or not the conveying speed of a sheet is lowered during humidification. If it is determined that the conveying speed of a sheet is lowered during humidification, the process proceeds to step S76. Conversely, if it is not determined that the conveying speed of a sheet is lowered during humidification, the process proceeds to step S77.

In step S76, the conveying speed of a sheet, to which water is applied, is lowered than the base conveying speed. In step S77, it is determined whether or not control of the humidifier 550 is finished. If it is determined that control of the humidifier 550 is finished, the process is terminated. Conversely, if it is not determined that control of the humidifier 550 is finished, the process returns to step S73.

In step S78, it is determined whether or not the charge applicator 500 is implemented as the function unit. If it is determined that the charge applicator 500 is implemented as the function unit, the process proceeds to step S79. Conversely, if it is not determined that the charge applicator 500 is implemented as the function unit, the process is terminated.

In step S79, it is determined whether or not control of the charge applicator 500 is started. If it is determined that control of the charge applicator 500 is started, the process proceeds to step S80. Conversely, if it is not determined that control of the charge applicator 500 is started, the process stands by in step S79.

In step S80, it is determined whether or not the amount of charge applied to a sheet is increased. If it is determined that the amount of charge applied to the sheet is increased, the process proceeds to step S81. Conversely, if it is not determined that the amount of charge applied to the sheet is increased, the process proceeds to step S82.

In step S81, the amount of charge applied to the sheet is increased more than the base charge amount. In step S82, it is determined whether or not control of the charge applicator 500 is finished. If it is determined that control of the charge applicator 500 is finished, the process is terminated. Conversely, if it is not determined that control of the charge applicator 500 is finished, the process returns to step S80.

As has been discussed above, in accordance with the present embodiment, the control unit 1000 controls the agent application amount in accordance with the function unit implemented between the image forming apparatus 3 and the finisher 6. If the agent application amount to be applied to a sheet is determined in accordance with the function unit, control can be performed by taking into consideration the agent application amount which can be applied to the sheet with reference to the function unit. Accordingly, it is possible to perform control of the entire system.

Also, in the case of the present embodiment, if it is determined that the humidifier 550 is implemented as the function unit, the control unit 1000 increases the amount of water applied to a sheet more than the base water amount, or lowers the conveying speed of a sheet, to which water is applied, than the base conveying speed. If the humidifier 550 is available as the function unit, the electricity on a sheet can be eliminated by humidification. Specifically, since both the front and back sides of a sheet can be humidified, transportation of charge on the sheet can be accelerated. Namely, charge on a sheet can be easily conducted to ground through water so that uneven electrification of the sheet can be made flat. As a result, since the differential potential between the front and back sides of a sheet can be reduced, it is possible to prevent sheets from sticking to each other due to the differential potential.

Also, in the case of the present embodiment, if it is determined that the charge applicator 500 is implemented as the function unit, the control unit 1000 increases the amount of charge applied to a sheet more than the base charge amount. If the charge applicator 500 is installed as the function unit, the electricity on a sheet can be neutralized by applying charge. Specifically, since charge can be applied to both the front and back sides of a sheet, charge on the sheet can entirely be neutralized. Accordingly, since the total amount of charge on a sheet can be stabilized, the differential potential between the front and back sides of the sheet can be reduced. As a result, it is possible to prevent sheets from sticking to each other.

Embodiment 5

In this embodiment 5, similar elements are given similar references as in the embodiments 1 through 4, and therefore no redundant description is repeated. The embodiment 5 differs from the embodiments 1 through 4 in that a function unit is determined by user's operation.

Figure 21:
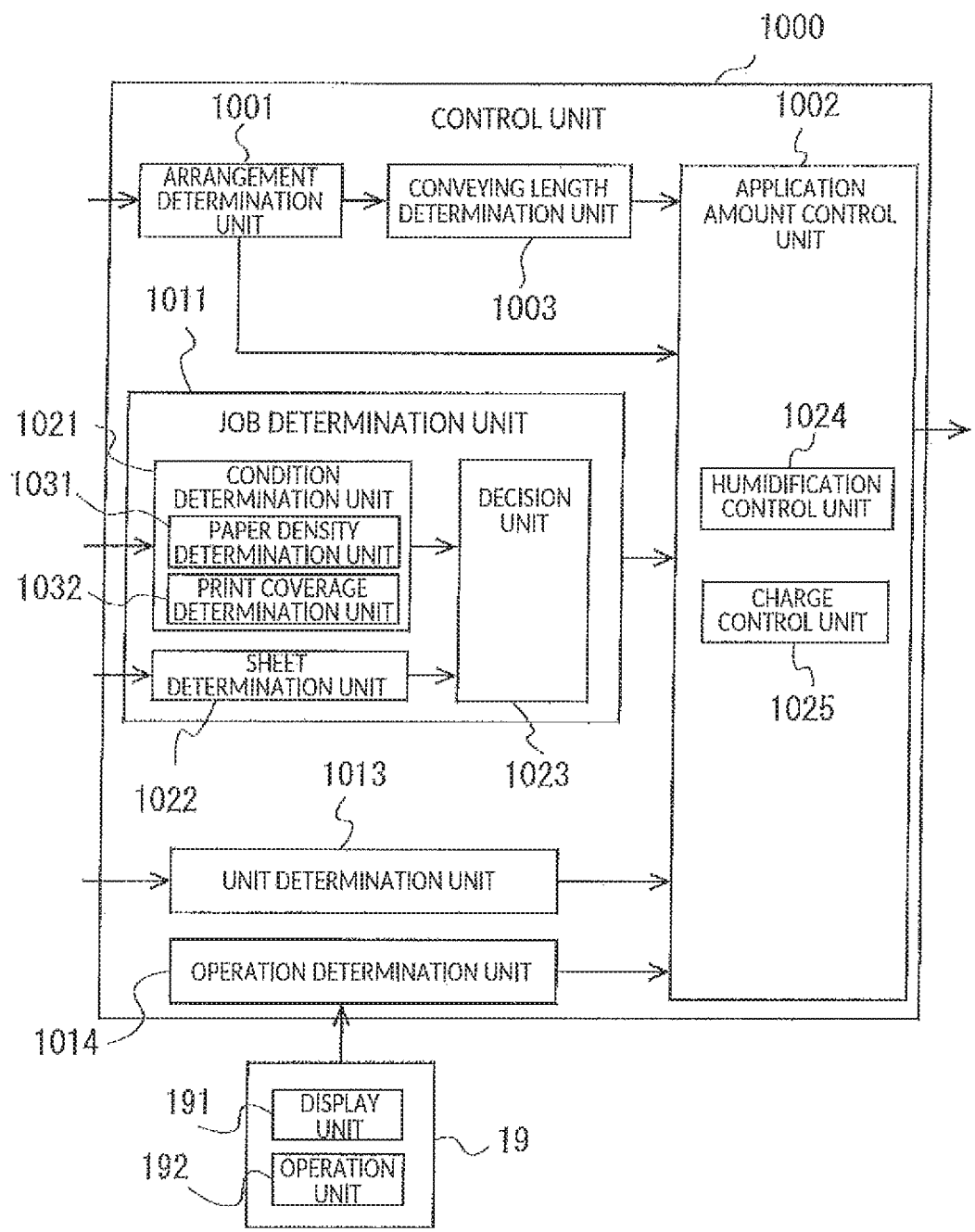
FIG. 21 is a view showing one example of the functional configuration of the control unit 1000 in accordance with an embodiment 5 of the present invention.

FIG. 21 is a view showing one example of the functional configuration of the control unit 1000 in accordance with the embodiment 5 of the present invention. As shown in FIG. 21, the control unit 1000 is further provided with an operation determination unit 1014. The operation determination unit 1014 determines whether or not the operation content accepted through the operation panel 19 indicates that the humidifier 550 is implemented as the function unit. Also, the operation determination unit 1014 determines whether or not the operation content accepted through the operation panel 19 indicates that the charge applicator 500 is implemented as the function unit.

When the operation determination unit 1014 determines that the operation content accepted through the operation panel 19 indicates that the humidifier 550 is implemented as the function unit, the humidification control unit 1024 increases the amount of water applied to a sheet more than the base water amount. Incidentally, when the operation determination unit 1014 determines that the operation content accepted through the operation panel 19 indicates that the humidifier 550 is implemented as the function unit, the humidification control unit 1024 may lower the conveying speed of a sheet, to which water is applied, than the base conveying speed.

When the operation determination unit 1014 determines that the operation content accepted through the operation panel 19 indicates that the charge applicator 500 is implemented as the function unit, the charge control unit 1025 increases the amount of charge applied to a sheet more than a base charge amount.

Figure 22:
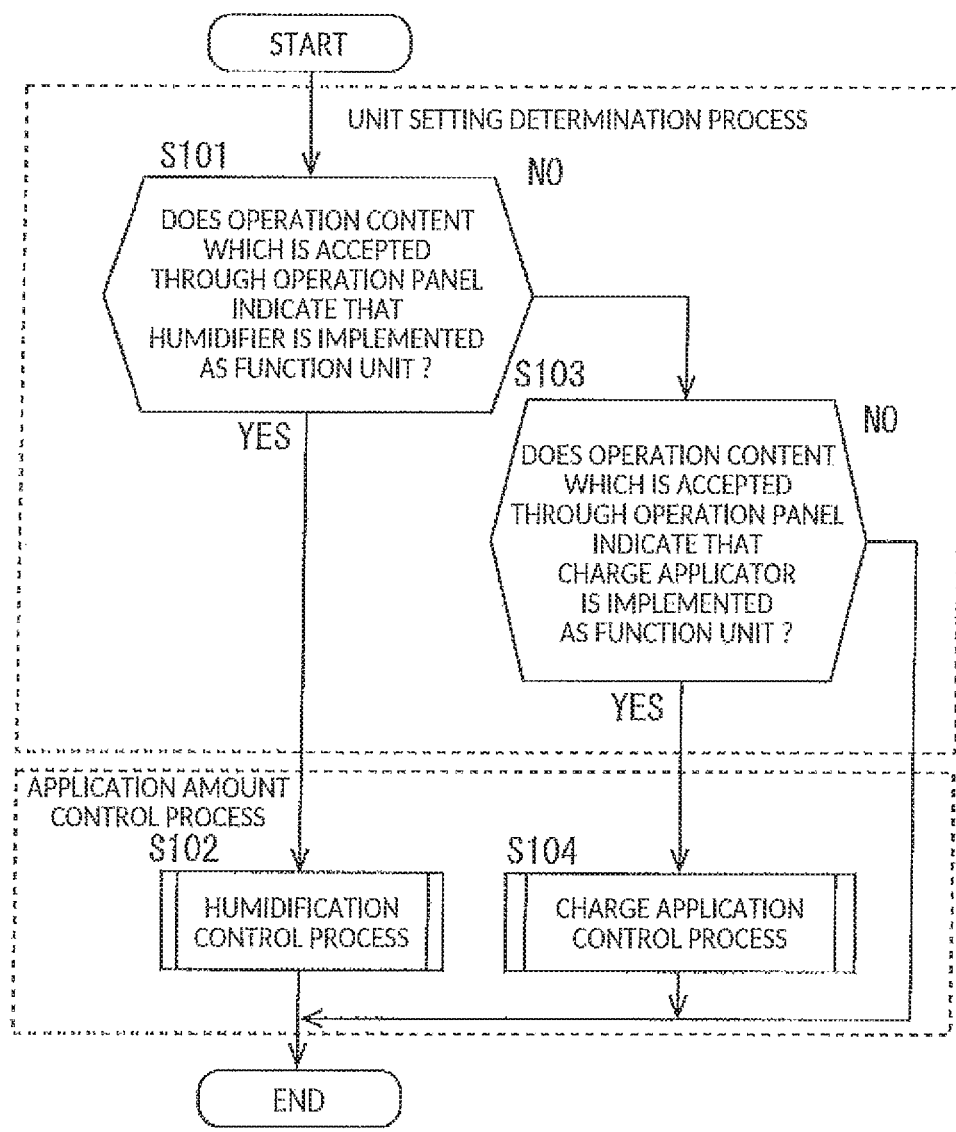
FIG. 22 is a flow chart for explaining an example of control by the control unit 1000 in accordance with the embodiment 5 of the present invention.

FIG. 22 is a flow chart for explaining an example of control by the control unit 1000 in accordance with the embodiment 5 of the present invention. Incidentally, the process in steps S101 and S103 corresponds to a unit setting determination process. The process in steps S102 and S104 corresponds to an application amount control process.

In step S101, it is determined whether or not the operation content accepted through the operation panel 19 indicates that the humidifier 550 is implemented as the function unit. If it is determined that the operation content accepted through the operation panel 19 indicates that the humidifier 550 is implemented as the function unit, the process proceeds to step S102. Conversely, if it is not determined that the operation content accepted through the operation panel 19 indicates that the humidifier 550 is implemented as the function unit, the process proceeds to step S103.

In step S102, the humidification control process is performed. The humidification control process in step S102 corresponds to the humidification control process in steps S72 to S77 of FIG. 20. In step S103, it is determined whether or not the operation content accepted through the operation panel 19 indicates that the charge applicator 500 is implemented as the function unit. If it is determined that the operation content accepted through the operation panel 19 indicates that the charge applicator 500 is implemented as the function unit, the process proceeds to step S104. Conversely, it is not determined that the operation content accepted through the operation panel 19 indicates that the charge applicator 500 is implemented as the function unit, the process is terminated. In step S104, the charge application control process is performed. The charge application control process in step S104 corresponds to the charge application control process in steps S79 to S82 of FIG. 20.

As has been discussed above, in accordance with the present embodiment, if it is determined that the operation content accepted through the operation panel 19 indicates that the humidifier 550 is implemented as the function unit, the control unit 1000 increases the amount of water applied to a sheet more than the base water amount, or lowers the conveying speed of a sheet, to which water is applied, than the base conveying speed.

Accordingly, not only by enabling the control unit 1000 to take control in accordance with automatic determination of apparatus arrangement, but also by enabling a user to select humidification control, it is possible to perform the automatic determination or manual setting of apparatus arrangement in accordance with a usage environment. Accordingly, the user-friendliness of the image forming system 1 can be improved.

Furthermore, in the case of the present embodiment, when the operation content accepted through the operation panel 19 indicates that the charge applicator 500 is implemented as the function unit, the control unit 1000 increases the amount of charge applied to a sheet more than the base charge amount.

Accordingly, not only by enabling the control unit 1000 to take control in accordance with automatic determination of apparatus arrangement, but also by enabling a user to select charge application control, it is possible to perform the automatic determination or manual setting of apparatus arrangement in accordance with a usage environment. Accordingly, the user-friendliness of the image forming system 1 can be improved.

Embodiment 6

In this embodiment 6, similar elements are given similar references as in the embodiments 1 through 5, and therefore no redundant description is repeated. The embodiment 6 differs from the embodiments 1 through 5 in that the agent application amount is controlled in accordance with the application area of a sheet where water or charge is applied.

Figure 23:
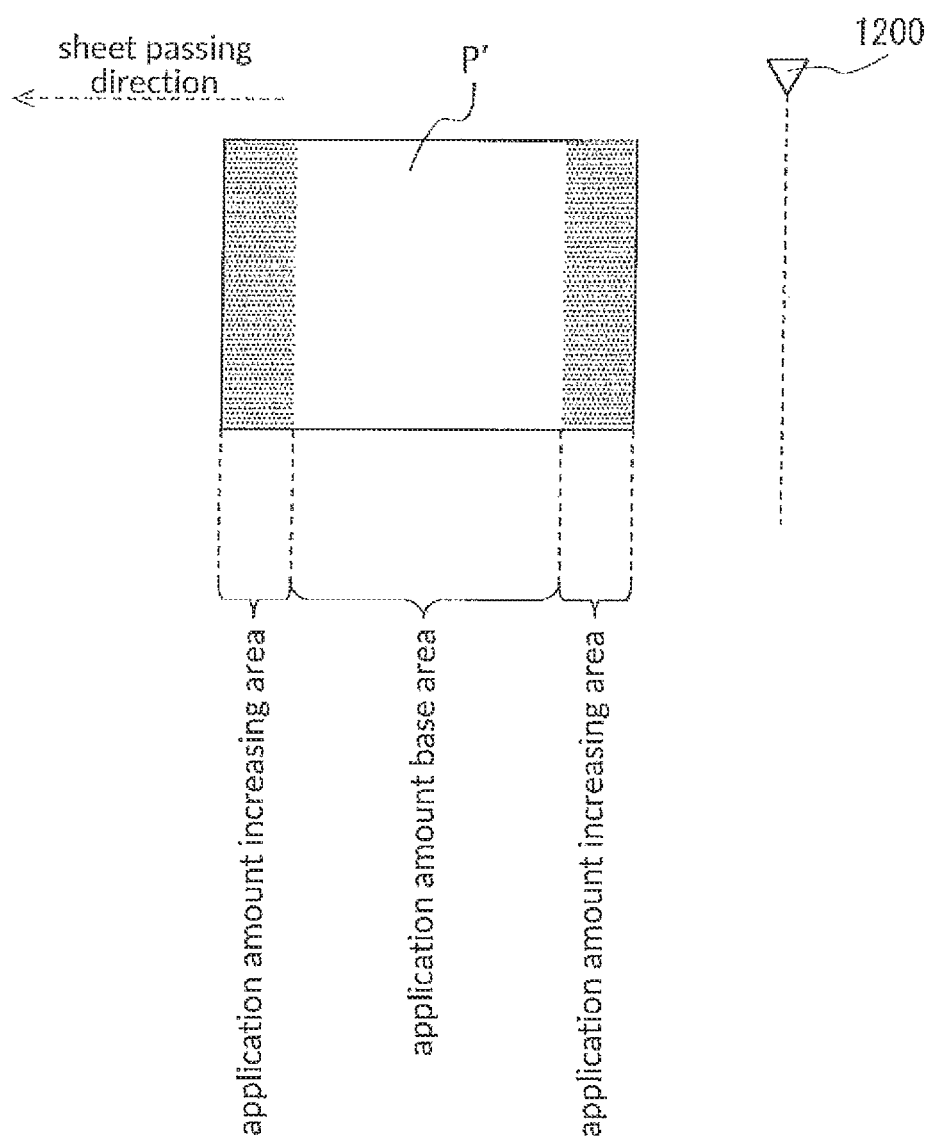
FIG. 23 is a view for explaining an example of application areas of a sheet where water or charge is applied in accordance with an embodiment 6 of the present invention.

FIG. 23 is a view for explaining an example of application areas of a sheet where water or charge is applied in accordance with the embodiment 6 of the present invention. As shown in FIG. 23, of the application areas where water or charge is applied, the leading and the tail areas are defined as application amount increasing areas where the agent application amount is increased. An edge detector 1200 is installed in the housing of the humidifier 550, arranged on the conveying route of a sheet, and implemented with a reflection type sensor. Based on the detection result of the edge detector 1200, it is determined whether or not the application amount increasing area of a sheet is passing through the first application roller 501 or the second application roller 501'.

Figure 24:
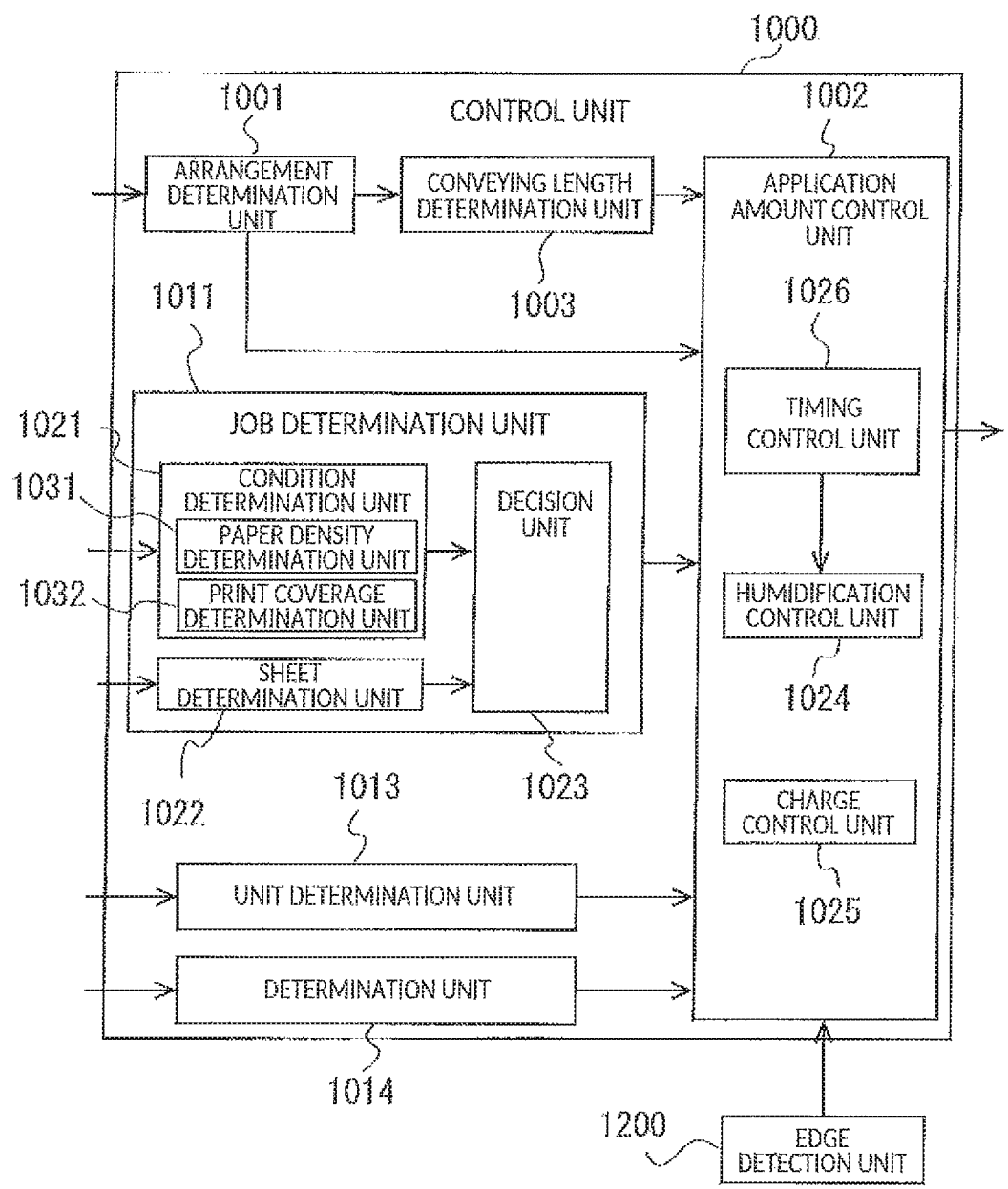
FIG. 24 is a view showing an example of a functional architecture of a control unit 1000 in accordance with the embodiment 6 of the present invention.

FIG. 24 is a view showing an example of a functional architecture of a control unit 1000 in accordance with the embodiment 6 of the present invention. As shown in FIG. 24, the application amount control unit 1002 is provided further with a timing control unit 1026. The timing control unit 1026 identifies the leading area or the tail area of a sheet based on the timing of detecting the leading edge of a sheet by the edge detector 1200. When the timing control unit 1026 determines that an agent is applied to at least one of the leading and tail areas of a sheet, the humidification control unit 1024 increases the water application amount more than the base application amount.

As has been discussed above, in accordance with the present embodiment, the control unit 1000 controls the application amount in accordance with the application area where water is applied.

While conveying a sheet, the sheet consists of a part which is held by the sheet conveyor 731 and a part which is not held by the sheet conveyor 731. In other words, the sheet consists of a part whose attitude is unstable and a part whose attitude is stable. When attitude of a sheet is unstable, since the sheet may flap during conveyance, it is estimated that the sheet comes in strong contact with the paper path 10. If the sheet comes in strong contact with the paper path 10, since frictional charge increases on the sheet, it is estimated that the electricity on the sheet increases. The application amount can thereby be controlled in a more appropriate manner by controlling the application amount to be applied to a sheet in accordance with the application area where an agent is applied to the sheet.

Namely, in the case of the present embodiment, while applying water to at least one of the leading and tail areas of a sheet, the control unit 1000 increases the water application amount more than the base application amount.

Specifically, a sheet becomes unstable near the leading end and the tail end thereof. Accordingly, since a sheet is estimated to come in strong contact with the paper path 10 near the leading end and the tail end, a much amount of friction charge is estimated to be generated near the leading end and the tail end of the sheet. On the other hand, the other area of a sheet than the leading end and the tail end of the sheet is nipped by the roller pair of the sheet conveyor 731 so that attitude of the sheet is stable. Accordingly, except the area other than the leading end and the tail end of a sheet, there is a little amount of friction charge on the sheet. Since a much amount of friction charge is estimated to be generated near the leading end and the tail end of the sheet, thereby, it is possible to appropriately control a water application amount by increasing the water application amount near the leading end and the tail end of the sheet.

Also, in the case of the present embodiment, the control unit 1000 identifies the leading area and the tail area of a sheet based on the timing of detecting an edge of the sheet with the edge detector 1200.

Since an application area of a sheet to which an agent is to be applied can be accurately identified based on the timing of detecting an edge of the sheet to control application of the agent, it is possible to apply a much amount of the agent to an area where a much amount of charge is generated.

Embodiment 7

In this embodiment 7, similar elements are given similar references as in the embodiments 1 through 6, and therefore no redundant description is repeated. Explanation of the embodiment 7 is directed to examples of processes performed by combining parts of the processes of the embodiments 1 to 6 or combining a plurality of the processes of the embodiments 1 to 6.

Figure 25:
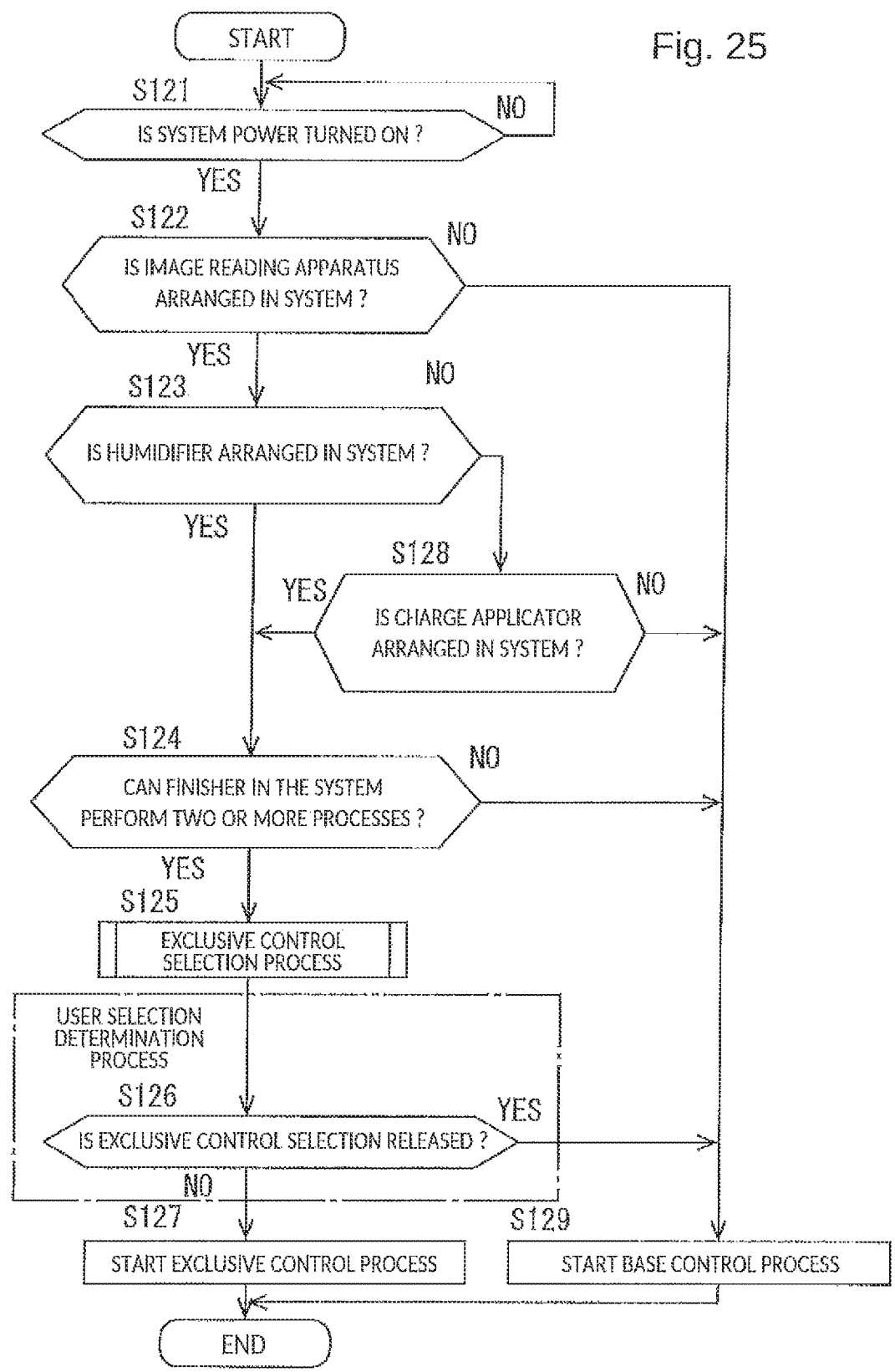
FIG. 25 is a flow chart for explaining an example of control in accordance with an embodiment 7 of the present invention.

FIG. 25 is a flow chart for explaining an example of control in accordance with the embodiment 7 of the present invention. Incidentally, the processes described in steps S122, S123 and S124 respectively are not limited to be sequentially performed in the order as shown in FIG. 25, but can be performed in parallel, or can be performed in a different order. For example, the process in step S122 and the process in step S124 can be performed in parallel after the process in step S123.

Also, the process in step S126 corresponds to a user selection determination process. The user selection determination process is a process based on the operation content of a user accepted through the operation panel 19.

In step S121, it is determined whether or not a system power is turned on. If it is determined that a system power is turned on, the process proceeds to step S122. Conversely, if it is not determined that a system power is turned on, the process stands by in step S121.

In step S122, it is determined whether or not the image reading apparatus 4 is arranged in the system. If it is determined that the image reading apparatus 4 is arranged in the system, the process proceeds to step S123. Conversely, if it is not determined that the image reading apparatus 4 is arranged in the system, the process proceeds to step S129.

In step S123, it is determined whether or not the humidifier 550 is arranged in the system. If it is determined that the humidifier 550 is arranged in the system, the process proceeds to step S124. Conversely, if it is not determined that the humidifier 550 is arranged in the system, the process proceeds to step S128.

In step S124, it is determined whether or not the finisher 6 in the system can perform two or more processes. If it is determined that the finisher 6 in the system can perform two or more processes, the process proceeds to step S125. Conversely, if it is not determined that the finisher 6 in the system can perform two or more processes, the process proceeds to step S129.

In step S125, an exclusive control selection process is performed. The exclusive control selection process will be described later.

In step S126, as the user selection determination process, it is determined whether or not exclusive control selection is released. If it is determined that exclusive control selection is released, the process proceeds to step S129. Conversely, if it is not determined that exclusive control selection is released, the process proceeds to step S127.

In step S127, the process of exclusive control is started. The process of exclusive control is a process of increasing the agent application amount more than the base application amount. Specifically, this process is a process of increasing the amount of humidifying water more than the base water amount, or a process of increasing the amount of charge more than the base charge amount. Incidentally, the speed of conveying a sheet during humidification may be lowered than the base conveying speed.

In step S128, it is determined whether or not the charge applicator 500 is arranged in the system. If it is determined that the charge applicator 500 is arranged in the system, the process proceeds to step S124. Conversely, if it is not determined that the charge applicator 500 is arranged in the system, the process proceeds to step S129.

In step S129, the process of a normal control is started. The process of a normal control is a process of controlling an agent application amount to the base application amount. Specifically, this process is a process of controlling the amount of humidifying water to be the base water amount, or a process of controlling the amount of charge to be the base charge amount. Incidentally, the speed of conveying a sheet during humidification may be controlled to be the base conveying speed.

Meanwhile, the base application amount, the base water amount, the base charge amount and the base conveying speed can be set up based on the various conditional changes during conveying a sheet to the finisher 6 without passing through the image reading apparatus 4.

Figure 26:
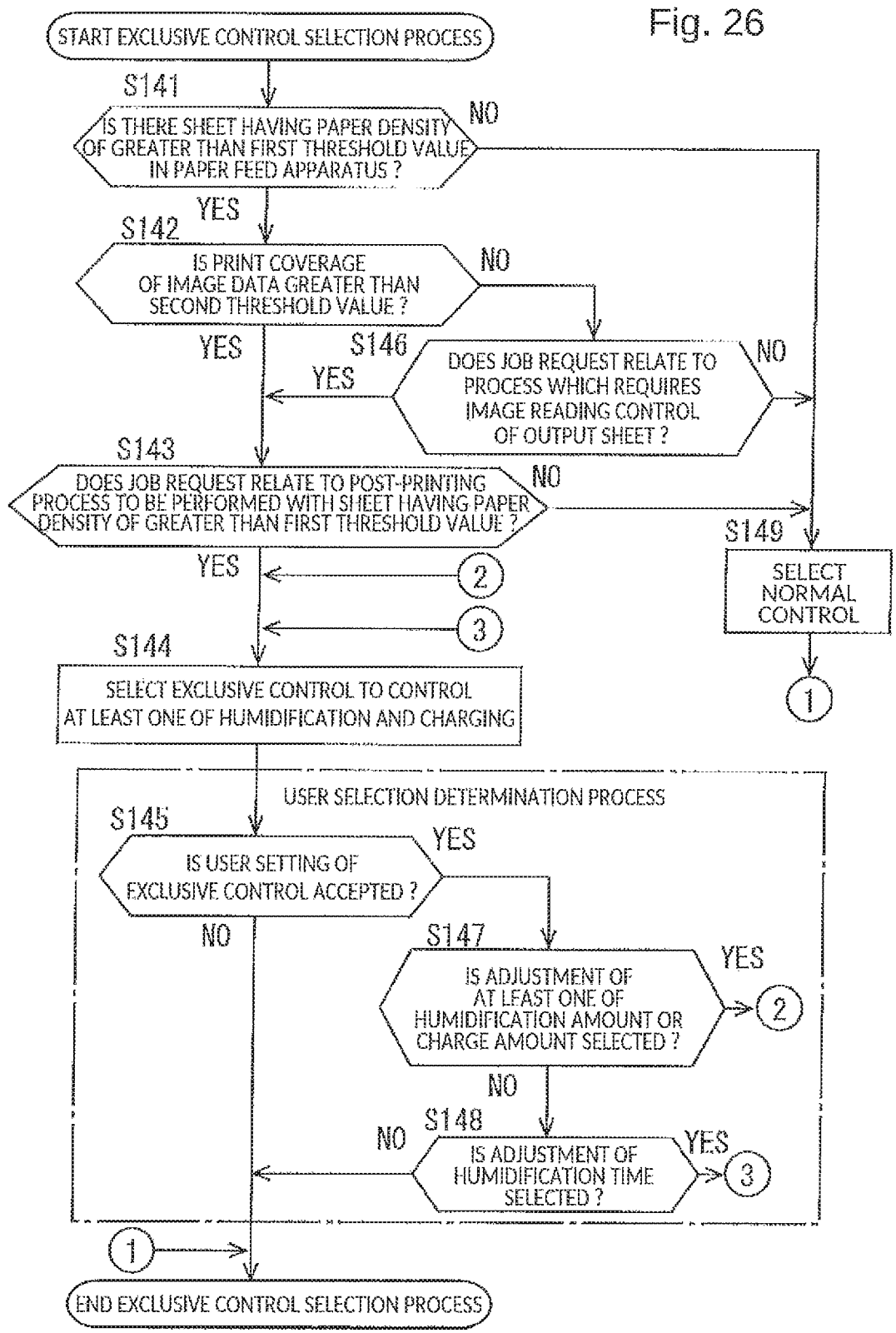
FIG. 26 is a flow chart for explaining an example of the exclusive control process in accordance with the embodiment 7 of the present invention.

FIG. 26 is a flow chart for explaining an example of the exclusive control process in accordance with the embodiment 7 of the present invention. Incidentally, the process in steps S145, S147 and S148 corresponds to the user selection determination process.

In step S141, it is determined whether or not there is a sheet having a paper density of greater than a first threshold value in the paper feed apparatus 2. If it is determined that there is a sheet having a paper density of greater than a first threshold value in the paper feed apparatus 2, the process proceeds to step S142. Conversely, if it is not determined that there is a sheet having a paper density of greater than a first threshold value in the paper feed apparatus 2, the process proceeds to step S149. Incidentally, the first threshold value is for example 100 gsm.

In step S142, it is determined whether or not the print coverage of image data is greater than a second threshold value. If it is determined that the print coverage of image data is greater than the second threshold value, the process proceeds to step S143. Conversely, if it is not determined that the print coverage of image data is greater than the second threshold value, the process proceeds to step S146. Incidentally, this image data is data which is directly received by the image forming apparatus 3 for image formation so that the accuracy thereof is higher than that of data which is acquired by the image reading unit 12. The second threshold value is for example 20%. Alternatively, it is determined whether or not the ratio of the area, where toner is attached, to the paper size is greater than the second threshold value. Incidentally, the ratio of the area, where toner is attached, to the paper size is the ratio of the image formed of a plurality of toner layers to the paper size.

In step S143, it is determined whether or not a job request relates to a post-printing process to be performed with a sheet having a paper density of greater than the first threshold value. If it is determined that the job request relates to a post-printing process to be performed with a sheet having a paper density of greater than the first threshold value, the process proceeds to step S144. Conversely, if it is not determined that the job request relates to a post-printing process to be performed with a sheet having a paper density of greater than the first threshold value, the process proceeds to step S149.

In step S144, exclusive control is selected to control at least one of humidification and charging.

Meanwhile, in the case where only the humidifier 550 is installed as the function unit in the system, humidification control is selected in step S144. Also, in the case where only the charge applicator 500 is installed as the function unit in the system, charging control is selected in step S144. Furthermore, in the case where both the humidifier 550 and the charge applicator 500 are installed as the function units in the system, at least one of humidification control and charging control is selected. Also, the conveying speed of a sheet, which is humidified, may be lowered than the base conveying speed in order to adjust the humidification time of the exclusive control.

Furthermore, the result of the user selection determination process may be reflected in the process of step S144. For example, even in the case where both the humidifier 550 and the charge applicator 500 are arranged and both the humidification control and the charging control are selected, a user may select again only one of the humidification control and the charging control.

In step S145, it is determined whether or not a user setting of the exclusive control is accepted. If it is determined that a user setting of the exclusive control is accepted, the process proceeds to step S147. Conversely, if it is not determined that a user setting of the exclusive control is accepted, the exclusive control selection process is terminated.

In step S146, it is determined whether or not a job request relates to a process which requires image reading control of an output sheet P'. The image reading control of an output sheet P' is control to read the image of the output sheet P' by the image reading apparatus 4 and feed back the result thereof to the image forming apparatus 3.

If it is determined that a job request relates to a process which requires image reading control of an output sheet P', the process proceeds to step S143. Conversely, if it is not determined that a job request relates to a process which requires image reading control of an output sheet P', the process proceeds to step S149.

In step S147, it is determined whether or not to select adjustment of at least one of a humidification amount or a charge amount. If it is determined to select adjustment of at least one of a humidification amount or a charge amount, the process proceeds to step S144. Conversely, it is not determined to select adjustment of at least one of a humidification amount or a charge amount, the process proceeds to step S148.

In step S148, it is determined whether or not to select adjustment of a humidification time. If it is determined to select adjustment of a humidification time, the process proceeds to step S144. Conversely, if it is not determined to select adjustment of a humidification time, the exclusive control selection process is terminated.

Namely, the user selection determination process is a process which includes the processes in steps S145, S147 and S148 to accept manual change of control selected in step S144. Incidentally, while omitting explanation with reference to a flow chart, the humidification amount, the charge amount and the humidification time can readily be adjusted by a user. Also, as explained above, it is desirable to increase the humidification amount, the charge amount and the humidification time in proportion to the conveying length of a sheet, the paper density of the sheet, the print coverage of an image and the thickness of the sheet, and therefore these control parameters may be adjusted with reference to a control table or the like.

As has been discussed above, in accordance with the present embodiment, like each of the embodiments 1 to 6, the differential potential between the front and back sides of a sheet in the upstream side of the finisher 6 is controlled to decrease based on the amount of charge which is generated on a sheet when passing through the paper path 10. Accordingly, even in the case where the image reading apparatus 4 is arranged in the upstream side of the finisher 6, it is possible to prevent degradation of the quality of a post-printing process due to static electricity of a sheet.

The information processing system 1 have been explained based on the embodiment in accordance with the present invention. However, it is not intended to limit the present invention to the precise form described, and obviously many modifications and variations are possible without departing from the spirit and scope of the invention.

For example, while the electricity eliminator 5 is provided as an separate unit in the case of the above embodiments, the present invention is not limited thereto. For example, the electricity eliminator 5 may be incorporated within the image reading apparatus 4 or the like.

Also, while the electricity eliminator 5, the finisher 6 and the sheet discharger 7 are separately arranged in the case of the above embodiments, the function of the electricity eliminator 5, the function of the finisher 6 and the function of the sheet discharger 7 may be implemented within a single apparatus which is located in the downstream side of the image reading apparatus 4.

Furthermore, while the explanation of this embodiment is directed to examples of processes performed by combining parts of the processes of the embodiments 1 to 6 or combining a plurality of the processes of the embodiments 1 to 6, the present invention is not limited thereto but applicable to the processes of various combination thereof.

Still further, the first threshold value and the second threshold value are provided only for illustrative purpose, and the present invention is not limited thereto but can be implemented with other values. In brief, the first threshold value and the second threshold value can be determined based on the entirety of the image forming system 1 and sheets which are used.

Incidentally, the user selection determination process of the present embodiment can be performed after a paper jam occurs, after such a condition occurs that sheets cannot be stacked on the catch tray 8, or the like.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming system including an image forming apparatus that forms an image on a sheet, and a finisher that performs a post-printing process with the sheet, the image forming system comprising:
   a paper path through which the sheet is passed;
   an electricity eliminator that is arranged in the upstream side of the finisher to apply at least one agent of water and charge to the sheet; and
   a hardware processor that controls an application amount of the agent to be applied to the sheet by the electricity eliminator based on an amount of charge which is generated on the sheet when the sheet is passing through the paper path.

2. The image forming system of claim 1 further comprising:
   an image reading apparatus that is freely arranged between the image forming apparatus and the finisher to read the image, wherein
   the hardware processor controls the application amount in accordance with whether or not the image reading apparatus is arranged between the image forming apparatus and the finisher.

3. The image forming system of claim 2 wherein
   if it is determined that the image reading apparatus is arranged between the image forming apparatus and the finisher, the hardware processor increases the application amount more than a base application amount.

4. The image forming system of claim 3 wherein the image reading apparatus further comprising a sheet conveyor, and wherein
the hardware processor increases the application amount as the conveying length of the sheet conveyed by the sheet conveyor increases along the paper path.

5. The image forming system of claim 4 wherein the hardware processor controls the application amount based on a job content of the image forming apparatus.

6. The image forming system of claim 5 wherein the hardware processor determines the application amount based on image formation conditions relating to a job content.

7. The image forming system of claim 6 wherein the hardware processor increases the application amount as a paper density increases as one of the image formation conditions.

8. The image forming system of claim 7 wherein the hardware processor increases the application amount as print coverage of an image formed on the sheet or the ratio of the area where toner is attached to the paper size, increases as one of the image formation conditions.

9. The image forming system of claim 8 wherein the hardware processor determines the agent application amount in accordance with a type of the sheet relating to the job content.

10. The image forming system of claim 9 wherein if it is determined that the type of the sheet is at least one of a coated paper and a thick paper, the hardware processor increases the application amount more than the base application amount.

11. The image forming system of claim 10 wherein the hardware processor increases the application amount as the type of the sheet is a thick paper and a thickness of the sheet increases.

12. The image forming system of claim 9 wherein if it is determined that the type of the sheet is a thin paper or that the image reading apparatus is not arranged between the image forming apparatus and the finisher, the hardware processor decides the application amount to be the base application amount.

13. The image forming system of claim 3 wherein the hardware processor controls the application amount in accordance with a function unit implemented between the image forming apparatus and the finisher.

14. The image forming system of claim 13 wherein the electricity eliminator is provided with a humidifier which is freely arranged between the image forming apparatus and the finisher to apply water to front and back sides of the sheet, and wherein if it is determined that the humidifier is implemented as the function unit, the hardware processor increases an amount of water applied to the sheet more than the base water amount, or lowers a conveying speed of the sheet, to which water is applied, than a base conveying speed.

15. The image forming system of claim 14 wherein the electricity eliminator is provided with an electricity applicator which is freely arranged between the image forming apparatus and the finisher to apply charge to front and back sides of the sheet, and wherein if it is determined that the electricity applicator is implemented as the function unit, the hardware processor increases the amount of charge applied to the sheet more than a base charge amount.

16. The image forming system of claim 15 further comprising
an operation panel which accepts user operations, wherein
if it is determined that operation content accepted through the operation panel indicates that the humidifier is implemented as the function unit, the hardware processor increases the amount of water applied to the sheet more than the base water amount, or lowers the conveying speed of the sheet, to which water is applied, than the base conveying speed.

17. The image forming system of claim 16 wherein if operation content accepted through the operation panel indicates that the charge applicator is implemented as the function unit, the hardware processor increases the amount of charge applied to the sheet more than the base charge amount.

18. The image forming system of claim 17 wherein the hardware processor controls the application amount in accordance with an application area where water is applied.

19. The image forming system of claim 18 wherein while applying water to at least one of leading and tail areas of the sheet, the hardware processor increases the water application amount more than the base application amount.

20. The image forming system of claim 19 further comprising
an edge detector that detects a leading edge of the sheet which is passing wherein
the hardware processor identifies the leading and tail areas of the sheet based on the timing of detecting the leading edge of the sheet with the edge detector.

21. The image forming system of claim 1 wherein the hardware processor determines a polarity of charge based on a relationship between the paper path and the sheet with respect to a triboelectric charging series.

* * * * *